(12) United States Patent
Niwata et al.

(10) Patent No.: US 6,595,415 B2
(45) Date of Patent: Jul. 22, 2003

(54) IC CARD PROCESSOR

(75) Inventors: Tsuyoshi Niwata, Kawasaki (JP); Shigeru Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/796,620

(22) Filed: Mar. 2, 2001

(65) Prior Publication Data

US 2001/0040183 A1 Nov. 15, 2001

Related U.S. Application Data

(63) Continuation of application No. PCT/JP99/00748, filed on Feb. 19, 1999.

(30) Foreign Application Priority Data

Sep. 30, 1998 (JP) ............................................. 10-277012

(51) Int. Cl.[7] .......................... G06K 5/00; G06K 19/00; G06K 19/06
(52) U.S. Cl. ...................... 235/380; 235/487; 235/492
(58) Field of Search ................................. 235/487, 492, 235/380, 486; 705/17; 902/26

(56) References Cited

U.S. PATENT DOCUMENTS

| | | | | |
|---|---|---|---|---|
| 5,546,523 A | * | 8/1996 | Gatto | 235/379 |
| 5,952,639 A | * | 9/1999 | Ohki et al. | 235/375 |
| 6,000,607 A | * | 12/1999 | Ohki et al. | 235/379 |
| 6,044,470 A | * | 3/2000 | Kuriyama | 711/164 |

FOREIGN PATENT DOCUMENTS

| | | |
|---|---|---|
| EP | 0 872 816 | 10/1996 |
| EP | 0 793 205 | 9/1997 |
| EP | 0 793 206 | 9/1997 |
| EP | 0 838 789 | 9/1997 |
| JP | 2-101597 | 4/1990 |
| JP | 6-76126 | 3/1994 |
| JP | 8-115389 | 5/1996 |
| JP | 9-286190 | 11/1997 |
| JP | 9-293163 | 11/1997 |
| JP | 9-307660 | 11/1997 |
| JP | 10 91533 | 4/1998 |
| JP | 10-105316 | 4/1998 |
| JP | 10-143617 | 5/1998 |
| JP | 10-334197 | 12/1998 |
| JP | 11-3388 | 6/1999 |

OTHER PUBLICATIONS

Copy of International Search Report of corresponding PCT/JP99/00748 dated May 25, 1999.
Copy of International Examination Report of corresponding PCT/JP99/00748 dated Feb. 19, 1999.

* cited by examiner

Primary Examiner—Karl D. Frech
Assistant Examiner—April Nowlin
(74) Attorney, Agent, or Firm—Armstrong, Westerman & Hattori, LLP

(57) ABSTRACT

The IC card processor comprises an MPU (51) for access control on an IC (22) for holding card side security code and card information, a keyboard (58A) for input of apparatus side security code used in collation with card side security code, and a nonvolatile memory (59) for storing the apparatus side security code. The MPU (51) reads out the apparatus side security code from the nonvolatile memory (59) when referring to the card information, and issues it to the IC (22). The IC (22) collates the entered apparatus side security code and the held card side security code, and when matched, being set in accessible state from the MPU (51), the MPU (51) accesses and reads the card information, and processes it as specified.

9 Claims, 26 Drawing Sheets

FIG.10

(DISPLAY SCREEN D1)

<UNLOCK MODE>

UNLK (DISPLAY SCREEN D2)

<LOCK MODE>

LOCK

FIG.15

| ADDRESS | MEMORY INFORMATION |
|---|---|
| 0 0 0 0 ∫ 0 0 1 0 | NAME INFORMATION |
| 0 0 1 1 ∫ 0 0 2 0 | NUMERICAL INFORMATION |
| 0 0 2 1 ∫ 0 0 3 0 | MEDICAL RECORD |
| 0 0 3 1 ∫ 0 0 4 0 | CRIMINAL RECORD |

FIG.16

| SECURITY LEVEL | NAME INFORMATION | NUMERICAL INFORMATION | MEDICAL RECORD | CRIMINAL RECORD |
|---|---|---|---|---|
| LEVEL 1 | × | × | × | × |
| LEVEL 2 | ○ | × | × | × |
| LEVEL 3 | ○ | ○ | × | × |
| LEVEL 4 | ○ | ○ | ○ | × |
| LEVEL 5 | ○ | ○ | ○ | ○ |

○→TO BE DISPLAYED、×→NOT TO BE DISPLAYED

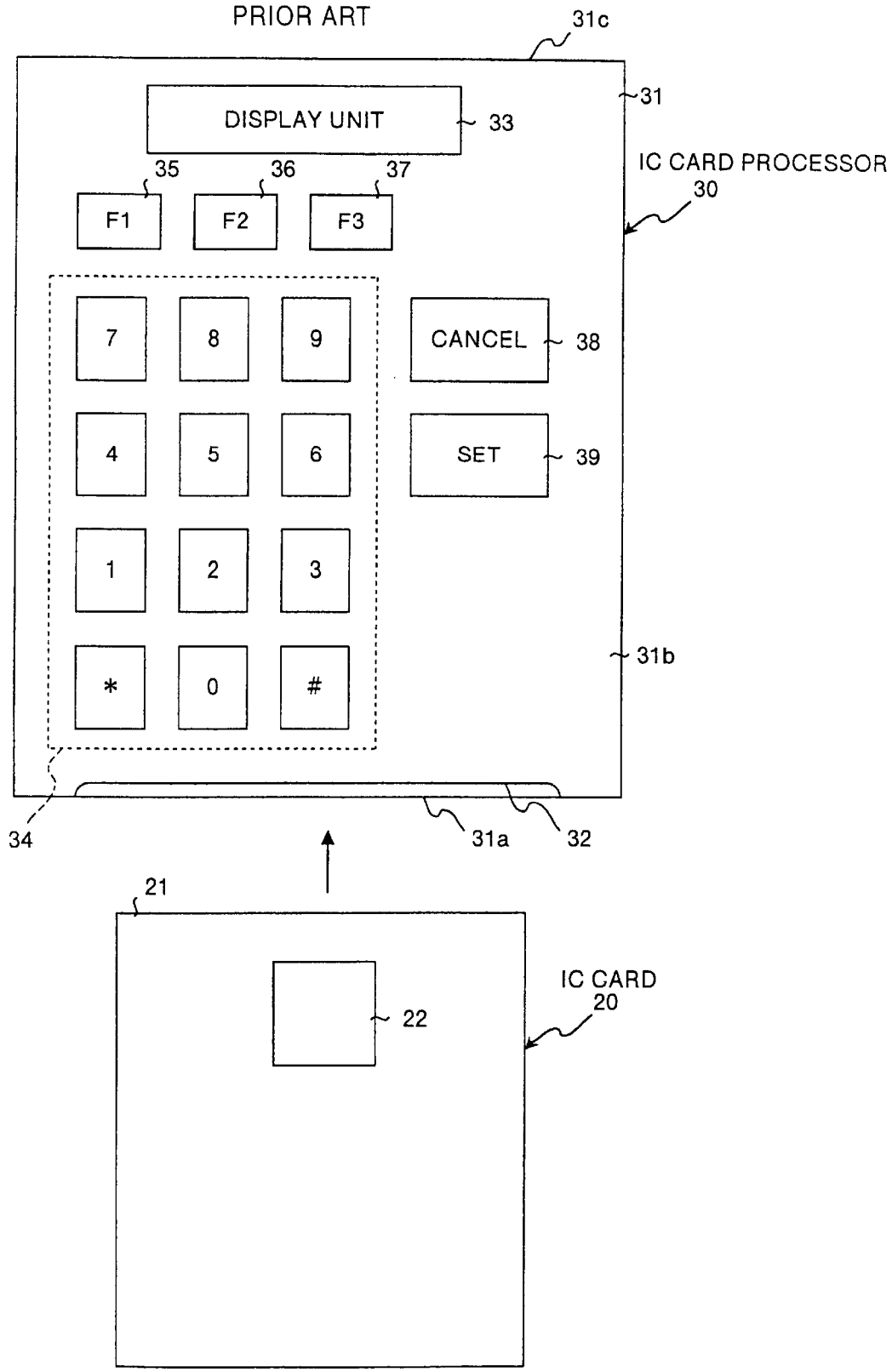

IC CARD PROCESSOR

This application is a Continuation of PCT/JP99/00748, filed Feb. 19, 1999.

TECHNICAL FIELD

The present invention in general relates to an IC card processor used in processing of card information in the IC card, for example, as electronic cash. More particularly, this invention relates to an IC card processor capable of improving the ease of use for users and also enhancing the security against leak of information.

BACKGROUND ART

Recently, the electronic cash is noticed as new currency replacing the bank notes. Among various forms of electronic cash, the IC card type electronic cash is close to the present form of transaction (the cash carried in consumer's wallet), and hence it is easy to use. The IC card is plastic card of the size of a credit card, on which a one-chip microcomputer composed of IC (integrated circuit) is mounted, and it is regarded as a holder of electronic cash.

The IC is composed of CPU (central processing unit) and EEPROM (electrically erasable and programmable ROM), and this EEPROM is a so-called nonvolatile memory capable of reading recorded data and writing data, not losing the memory if the power source is cut off. In the EEPROM, card information is stored, such as encrypted balance information, paid-in history information, and paid-out history information.

The IC card type electronic cash is classified into open type and closed type depending on whether the currency is electronic or settlement is electronic. The electronic currency is the open type electronic cash, and this open type electronic cash is like the present currency, and the electronic cash is distributed among people.

On the other hand, the electronic settlement is the closed type electronic cash, and in this closed type electronic cash, every time the electronic cash is used, it is returned to the issuing entity, and the electronic cash cannot be distributed without passing through the bank account, and it is beneficial from the viewpoint of compensation for loss because the history of use is recorded.

The user (consumer) carries the IC card as the electronic cash, and when shopping, the IC card is presented to the shop clerk, and the payment is settled. At the retail shop, a reader/writer is installed for reading and writing the card information stored in the EEPROM of the IC card, and the clerk inserts the presented IC card into the reader/writer, and processes the settlement. That is, when the IC card is inserted into the reader/writer, the purchase amount is deduced from the balance, and the purchase amount is added at the reader/writer side.

When only the card is carried, since the card information is electronic data, the user cannot know the balance directly. Accordingly, hitherto, an IC card processor for displaying the card information of the IC card (balance information, paid-in history, paid-out history) is carried together with the IC card. As the IC card is compared to the cash, the IC card processor is like the wallet.

FIG. 21 is a plan showing the appearance of the conventional IC card processor 10. This IC card processor is an apparatus for processing the card information (balance information, paid-in history information, paid-out history information, etc.) in the IC card 20, and more specifically, depending on the selection operation by the user, this is the apparatus for reading or displaying the card information.

The IC card 20 is composed of a card substrate 21 and an IC 22, and, for example, it is a card applicable to the open type electronic money. This IC card is a so-called IC card with an external terminal. In the IC card 20, the card substrate 21 is made of a thin plate of PVC (polyvinyl chloride polymer), PVCA (polyvinyl chloride-vinyl acetate copolymer), or the like. The IC 22 is composed of CPU and EEPROM (not shown). In the following explanation, processing executed by the CPU is explained as being processed by the IC 22.

The IC operates as the power is supplied from the IC card processor 10. In the EEPROM, the card information is stored, such as the balance information, paid-in history information, paid-out history information, and card side security code. The card side security code is the code used in collation for checking if the user of the IC card 20 is the authorized user or not, and it is a kind of intrinsic codes of the IC card 20 called PIN (personal identification number).

The collation is briefly explained. The card side security code and the apparatus side security code entered from the IC card processor are collated, and when matched, the operation instructed by the IC card processor 10 is executed, and if not matched, the operation is not done. The apparatus side security code is entered in every operation by key input manipulation by the user. The specific procedure of collation is explained later.

Further, in a specific time after the IC 22 is activated by supply of power, it issues initial response data. The initial response data is the data composed of physical parameter of IC 22, connection information character such as logic characteristic of transmission protocol, general information about IC card 20 (for example, date of manufacture of card), and other control information characters.

On the other hand, in the IC card processor 10, the main body 1 is a nearly flat cocoon shape made of synthetic resin, and electric components mentioned below are contained in its inside. A card inlet 2 is a slit formed at one side 1a toward other side 1c, and at this card inlet 2, a connector (not shown) to be connected electrically to the terminal of the IC card 22 is provided as described below.

A display unit 32 is provided on the surface 1b of the main body 1 along the other side 1c, and is composed of liquid crystal display or the like. The display unit 3 displays the card information in the IC card 20 (balance information, paid-in history information, paid-out history information), security mode and security code of IC card 20 and others. The security mode is the mode showing whether the IC card 20 is in usable state or not, and it is roughly classified into the unlock mode and lock mode.

The unlock mode is the usable state of the IC card 20, in other words, it is an accessible state for allowing reading and writing of card information from the IC card processor 10 to the IC card 20 (IC 22). The lock mode is the unusable state of the IC card 20 in the IC card processor, in other words, it is an inaccessible state not allowing reading or writing of card information from the IC card processor 10 to the IC card 20 (IC 22). Herein, the security mode is changed from unlock mode to lock mode, for example, when it is intended by the authorized user or when it is illegally used by a third party (or by input error of security code by the authorized user).

A select key 4 is provided on the surface 1b of the main body 1, between the display unit 3 and the side 1a, and it is pushed by the user. This select key 4 is used for selecting the function of displaying the card information in the display unit 3 (hereinafter called card information display function), the function for changing the security mode (security mode changing function), and others. Specifically, every time the select key 4 is pressed, the functions are sequentially selected as card information display function, security mode changing function, and so forth.

A shift key 5 is provided on the surface 1b of the main body 1, near the select key 4, and it is pushed by the user for entering the apparatus side security code when collating the codes in the IC 22 of the IC card 20. The collation of codes is to match the card side security code and apparatus side security code. An enter key 6 is provided on the surface 1b, near the shift key 5, and it is pushed by the user when entering the apparatus side security code.

FIG. 22 is a block diagram showing an electric configuration of the IC card processor 10. In the diagram, the parts corresponding to the components in FIG. 21 are identified with same reference numerals and their explanation is omitted. In FIG. 22, an MPU (microprocessing unit) 11 is for controlling the parts of the apparatus, and the operation of the MPU 11 is explained in detail later. A power supply unit 12 is composed of a button type battery 12a and a switch 12b connected in series. One end of the battery 12a is connected to Vcc terminal, and other end is connected to GND terminal, and electric power is supplied to the parts of the apparatus and the IC 22 after the IC card 20 is inserted into the card inlet 2 (see FIG. 21). The switch 12b is turned on or off by the MPU 11.

An oscillator 13 generates a clock of a specific frequency, and supplies it to necessary parts. In the IC card processor 10, the parts operate according to the clock signal. A ROM (read only memory) 14 stores the application program for the IC card 20. This application program is executed by the MPU 11, and the program is for reading the card information stored in the EEPROM of the IC 22, and processing security and others.

A RAM (random access memory) 15 temporarily stores various data, variables and others occurring during execution of the application program by the MPU 11. A communication unit 16 is used for interface of communication between the IC 22 and MPU 11 when the IC 22 is inserted into the card inlet 2 (see FIG. 21) and is connected electrically. A detector 17 detects the IC 22 electrically when the IC 22 is inserted into the card inlet 2. A keyboard 18 is composed of select key 4, shift 5, and enter key 6 shown in FIG. 21. These constituent elements including the MPU 11, oscillator 13 and ROM 14 are mutually connected through a bus B.

The operation of this conventional IC card processor 10 is explained by referring to the flowcharts shown in FIG. 23 to FIG. 26. Referring first to FIG. 23 and FIG. 24, the card information display operation for displaying the card information of the IC card 20 in the display unit 3 of the IC card processor 10 is explained. Herein, FIG. 23 is a flowchart explaining the operation of the IC card processor 10 when displaying the card information of the IC card 20 in the display unit 3, and FIG. 24 is a flowchart explaining the operation of code collation of the IC card 20 in the IC 22.

In FIG. 21, when one side of the IC card 20 in unlock mode is inserted into the card inlet 2 of the IC card processor 10, the IC 22 and communication unit 16 shown in FIG. 22 are electrically connected, and the IC 22 is detected by the detector 17. Herein, since the IC card 20 (IC 22) is in unlock mode, it is ready to read and write from an external apparatus (IC card processor 10).

From the detector 17, the detection result information is issued to the MPU 11 through the bus B. As a result, the MPU 11 advances to step SA1 shown in FIG. 23, and controls the power supply unit 12 to feed electric power to the IC 22, thereby executing the activation process. Then electric power is fed into the IC 22 from the power supply unit 12, and the IC 22 is activated.

In a specific time after supply of power, the IC 22 sends the initial response data to the MPU 11 through the communication unit 16 and bus B, and advances to step SB1 shown in FIG. 24, and judges if the apparatus side security code is entered from the IC card processor 10 or not, and if the result of judgment is NO, the same judgment is repeated. Suppose the apparatus side security code is not entered in the IC 22.

On the other hand, when the initial response data is entered, the MPU 11 is triggered by the input of this initial response data, and accesses the ROM 14 through the bus BU, and executes the application program, and goes to step SA2.

At step SA2, the MPU 11 judges if the card information display function is selected or not by the user, and if the result of judgment is NO, the same judgment is repeated. When the user pushes the select key 4 (see FIG. 21) to select the card information display function of the IC card 20 in the display unit 3, the MPU 11 detects it, and judges YES at step SA2, and goes to step SA3.

At step SA3, the MPU 11 shows the input screen for input of apparatus side security code in the display unit 3, and advances to step SA4. As a result, the user observes the input screen and recognizes that the apparatus security code must be entered. Herein, the user is supposed to know the apparatus side security code of the own IC card 20.

At step SA4, the MPU 11 judges if the apparatus side security code is entered by the key operation using the select key 4, shift key 5 and enter key 6 by the user, and if judged NO, the same judgment is repeated. When the user enters the apparatus side security code into the MPU 11 through the keyboard 18 and bus B by pushing the keys, the MPU 11 judges YES at step SA4, and advances to step SA5.

At step SA5, the MPU 11 sends the entered apparatus side security code to the IC 22 of the IC card 20 through the bus B and communication unit 16, and advances to step SA6. At step SA6, the MPU 11 issues the command for reading the card information from the IC 22 to the IC 22 through the bus B and communication unit 16, and goes to step SA7. At step SA7, the MPU 11 accesses the IC 22, and judges if the card information is read from the IC 22 or not, and if judged NO, the same judgment is repeated.

When the apparatus side security code is entered in the IC 22, the IC 22 judges YES at step SB1 shown in FIG. 24, and advances to step SB2. At step SB2, the IC 22 collates the held card side security code with the entered apparatus side security code. When matched, the IC 22 judges YES at step SB2, and goes to step SB3, and permits reading of the held card information (balance information, paid-in history information, paid-out history information, etc.) on the basis of the entered command.

As a result, the MPU 11 is accessible to the IC 22, and reads the card information from the IC 22, and judges YES at step SA7 in FIG. 23, and goes to step SA8. At step SA8, the read card information (balance information, etc.) is displayed in the display unit 3, and the processing is over.

At step SB2 in FIG. 24, if not matched, the IC 22 judges NO, and advances to step SB4. A possible cause of failure in collation is input error of apparatus side security code by the authorized user (or third party). At step SB4, the IC 22 judges if non-matching is determined consecutively N times (for example, three times) at step SB2, and if judged NO, returning to step SB1, the same process is repeated.

On the other hand, when judged YES at step SB4, in other words, if the user enters wrong apparatus side security code consecutively N times, the IC 22 advances to step SB2. At step SB5, the MPU 11 judges that the IC card 20 is used illegally, and changes the security mode from unlock mode to lock mode, and terminates the processing. Herein, the IC 22 has the status information corresponding to the security mode, and the MPU 11 (see FIG. 22) checks the status information, and confirms whether the IC card 20 is in unlock mode or lock mode.

In this case, being set in lock mode, the IC card 20 (IC 22) cannot read or write any card information at all from the external apparatus (IC card processor 10). Generally, the IC card set in the lock mode due to the above cause and not having the security mode changing function mentioned below cannot be used unless the card issuing firm processes to change the security mode from lock mode to unlock mode.

If judged NO at step SB4 in FIG. 24, the MPU 11 cannot read the card information from the IC 22. In this case, therefore, the MPU 11 judges NO at step SA7 in FIG. 23, and advances to step SA9. At step SA9, the MPU 11 checks the status information of the IC 22 through the bus B and communication unit 16, and judges if the IC card 20 is in lock mode or not.

In this case, supposing the IC card 20 is in unlock mode, the MPU 11 judges NO at step SA9, and return to step SA3 to repeat the same process. In this case, the user enters the apparatus side security code again according to the input screen of the display unit 3.

On the other hand, when the IC card 20 is in lock mode at step SA9, the MPU 11 recognizes that reading of the card information from the IC card 20, and display of card information in the display unit 3 are disabled, and judges YES, and goes to step SA10. At step SA10, the MPU 11 displays the error information in the display unit 3, and terminates the processing. The user observes the error information on the display unit 3, and recognizes that the IC card 20 is in unusable state.

Referring now to FIG. 24, FIG. 25, and FIG. 26, the operation for changing the security mode of IC card 20 is explained. FIG. 25 is a flowchart explaining the operation of the IC card processor 10 in the security mode changing operation on the IC card 20, and FIG. 26 is a diagram showing an input operation example by the user at the time of apparatus side security code input and a display example of the display unit 3.

When the security mode of the IC card 20 (IC 22) shown in FIG. 22 is in lock mode, the MPU 11 advances to step SC1 in FIG. 25, and judges if the security mode changing function is selected by the user or not, and when judged NO, the same judgment is repeated. When the user pushes the select key 4 (see FIG. 21) so as to change the security mode of the IC card 20, the MPU 11 detects it, and judges YES at step SC1, and goes to step SC2.

At step SC2, the MPU 11 reads the status information (lock mode) held in the IC 22 through the bus B and communication unit 16, and recognizes the security mode of the IC card 20. In this case, the MPU 11 recognizes that the security mode is the lock mode, and goes to step SC3.

At step SC3, the MPU 11 shows the security mode recognized at step SC2 (in this case, the lock mode) in the display unit 3 (see FIG. 21), and advances to step SC4. In this case, since the security mode is the lock mode, the display unit 31 shows a character string LOCK as shown in display screen A1 in FIG. 26. Accordingly, by observing the display screen A1, the user recognizes that the IC card 20 is in lock mode. At step SC4 shown in FIG. 25, the MPU 11 judges if the enter key 6 (see FIG. 21) is pressed or not, and if judged NO, the same judgment is repeated.

The user goes to step SD1 shown in FIG. 26 in order to change the security mode from the lock mode to the unlock mode, and pushes the enter key 6 (FIG. 21), and advances to step SD2. As a result, the MPU 11 judges YES at step SC4 in FIG. 25, and advances to step SC5, and after execution of apparatus side security code input process mentioned below, going to step SC6, it is judged whether the apparatus side security code is entered or not. The apparatus side security code input process is explained below while referring to FIG. 26.

As the apparatus side security code, for example, when entering a four-digit code "5432", first, at step SD2, the user pushes the shift key 5 (see FIG. 21) in order to enter the numeral of the first digit (for example, 5) of the apparatus side security code. As a result, the display screen of the display unit 3 is changed from display screen A1 to display screen A2 by the control of the MPU 11, and a character-numeral string of "PC=1" (display screen A2) appears in the display unit 3. In this character-numeral string, "PC" means input of apparatus side security code, and "1" denotes the numeral of the first digit of the apparatus side security code.

Consequently, the user pushes the shift key 5 four times in total as shown at steps SD3 and SD4. As a result, the numeral of the first digit of the apparatus side security code is shifted every time the shift key 5 is pressed, that is, "PC=2" (display screen A3), "PC=3" (not shown), "PC=4" (not shown), and "PC=5" (display screen A4).

Next, at step SD5, the user pushes the enter key 6 to set the numeral of the first digit (5) of the apparatus side security code. As a result, the display screen of the display unit 3 is changed from "PC=5" (display screen A4) to "PC=-" (display screen A5). Herein, the character "-" is a marking character, meaning the numeral of the first digit (in this case, 5) of the already set apparatus side security code.

At step SD6, the user pushes the shift key 5 (see FIG. 21) to enter the numeral of the second digit (for example, 4) of the apparatus side security code. As a result, the display screen of the display unit 3 is changed from display screen 5 to display screen 6 by the control of the MPU 11, and the display unit 3 shows the character-numeral string "PC=-1" shown in display screen A6. In this character-numeral string, "1" denotes the numeral of the second digit of the apparatus side security code.

Hereinafter, the user enters the numeral of the second digit in the same manner as in the case of first digit numeral input operation. That is, at step SD7, when the user pushes the shift key 5, the character-numeral string "PC=-4" (display screen A7) is shown in the display unit, and at step SD8, the user pushes the enter key 6 to set the numeral "4" of the second digit. Thus, the display unit shows the numeral-character string "PC=——" (display screen A8).

Same as in the input operation of the first digit numeral, the user manipulates the key for entering the third digit numeral (in this case, 3), and advances to step SD9 to enter the final digit numeral (in this case, 2), and pushes the shift key 5. As a result, the character-numeral string of "PC=——1" (display screen A9) appears in the display unit 3.

At step SD10, when the shift key 5 is pressed, the display unit 3 shows the numeral-character string of "PC=——2"

(display screen A10), and the user pushes the enter key 6 at step SD11 in order to set the numeral if the final digit (in this case, fourth digit) Thus, the display unit 3 shows a character string "PC=—" (display screen A11), and the input of the four-digit apparatus side security code (5432) is completed.

As a result, the MPU judges YES at step SC6 in FIG. 25, and advances to step SC7, issues a command for changing the entered apparatus side security code (in this case, 5432) and the security mode to instruct to the IC 22, to the IC card 20 (IC 22) through the bus B and communication unit 16, and then goes to step SC8.

When the apparatus side security code and command are issued, the IC 22 collates the held card side security code with the apparatus side security code. When matched, the IC 22 changes the security mode from the present lock mode to unlock mode according to the entered command, and changes the status information to the information showing the unlock mode.

In this case, supposing to be matched by the IC 22, the security mode of the IC card (IC 22) is supposed to be changed from the lock mode to the unlock mode. On the other hand, if not matched by the IC 22, the security mode of the IC card 20 is not changed.

At step SC8, the MPU 11 reads the status information of the IC 22 through the bus B and communication unit 16, and confirms the security mode of the IC card 20. In this case, the MPU 11 confirms the unlock mode as the security mode of the IC card 20, and advances to step SC9. At step SC9, the MPU 11 judges if the security mode has been changed or not.

Specifically, when the checking result of security mode at step SC2 and the checking result of security mode at step SC8 are not matched (changed), the MPU 11 judges YES at step SC9, and goes to step SC10. On the other hand, when the both security modes are matched (not changed), the MPU 11 judges NO at step SC9, and returns to step SC3, and repeats the same process.

At step SC10, the MPU 11 shows the security mode of the IC card 20 confirmed at step SC8 (in this case, unlock mode) in the display unit 3. As a result, the display unit 3 shows UNLK or LOUT (display screen A12) shown in FIG. 26, and the user observes the display screen A12, and recognizes that the security mode of the IC card 20 has been changed from lock mode to unlock mode. In this example, the procedure of changing the security mode from lock mode to unlock mode is explained, but the procedure is same when changing from unlock mode to lock mode.

FIG. 27 shows a different conventional IC card processor 30. In FIG. 27, the IC card processor 30 is a pocket calculator type apparatus, and is larger than the IC card processor 10 (see FIG. 2) mentioned above. In the IC card processor 30, the main body 31 is a thick plate of synthetic resin, and electric components are contained inside. A card inlet 32 is formed as a slit in one side 31a toward other side 31c, and one side of an IC card 20 is inserted in this card inlet 32.

The display unit 33 is provided on the surface of the main body 31 along other side 31c. The function of the display unit 33 is same as that of the display unit 3 (see FIG. 21). A numeric keyboard 34 is composed of 0 key to 9 key, * key, and # key arranged in matrix on the surface 31b. The numeric keyboard 34 is used for input of apparatus side security code. Therefore, when using the IC card processor 30, the user directly enters the numerals (apparatus side security code) from the numeric keyboard 34, instead of the process at steps SD2 to SD11 (see FIG. 26).

A first function key 35, a second function key 36, and a third function key 37 are disposed on the surface 31b, beneath the display unit 33 in the drawing, and are used for the card information display function, security mode changing function and other selection function. A cancel key 38 is provided near the right side of the numeric keyboard 34, and is pushed by the user, for example, when canceling the apparatus security code entered through the numeric keyboard 34.

A set key 39 is like the enter key 6 (see FIG. 21), and is pushed by the user, for example, when establishing the entered apparatus side security code. The operation of the IC card processor 30 is same as the operation of the IC card processor (see FIG. 21), and detailed description is omitted.

In the conventional IC card processor 10, when displaying the card information of the IC card 20 in the display unit 3 or when changing the security mode, the apparatus side security code must be entered every time by user's manual input, and it was very inconvenient. In particular, for input of the apparatus side security code, a very complicated input operation was required as shown in FIG. 26, and input errors occurred very frequently.

In the conventional IC card processor 10, since all card information (balance information, paid-in history information, paid-out history information, etc.) is displayed in the display unit 3, it was a problem that the information high in security against information leak is easily disclosed to third party.

It is an object of this invention to provide an IC card processor improved in convenience for the user and heightened in security against information leak.

DISCLOSURE OF THE INVENTION

The IC card processor according to one aspect of this invention comprises a nonvolatile memory, a writing unit which reads the second security code from the IC when the IC card is connected and the first security code is not written in the nonvolatile memory and writes it as the first security code in the nonvolatile memory, a reading unit which reads the first security code from the nonvolatile memory when the IC card is connected, and reads out the card information from the IC after issuing it to the IC, and a control unit which processes the card information being read out by the reading unit as specified.

According to the above-mentioned aspect of this invention, in the initial state, when the IC card is connected, the second security code is readout from the IC by the writing unit, and the second security code is written into the nonvolatile memory as the first security code. In this state, when the IC card is connected again, the first security code is read out from the nonvolatile memory by the reading unit, and issued to the IC. As a result, in the IC, the first security code and second security code are matched in collation, and the card information is automatically read out from the reading unit.

The IC card processor according to another aspect of this invention comprises a nonvolatile memory, an inputting unit which enters the first security code, writing unit which writes the first security code entered by the inputting unit into the nonvolatile memory, a reading unit which reads the first security code from the nonvolatile memory when the IC card is connected, and reads out the card information from the IC after issuing it to the IC, and a control unit which processes the card information being read out by the reading unit as specified.

According to the above-mentioned aspect of this invention, when the first security code is entered by the inputting unit, this first security code is written into the nonvolatile memory by the writing unit. When the IC card is connected, the first security code is automatically read out by the nonvolatile memory, and issued to the IC. As a result, in the IC, when the first security code and second security code are matched, the card information is read out by the reading unit.

The IC card processor preferably comprises a level setting unit which sets plural levels in the card information, and a level selecting unit which selects one of the plural levels, in which the reading unit reads out the card information corresponding to the level selected by the level selecting unit.

Thus, the card information corresponding to the preset level is read out.

The level selecting unit preferably comprises plural operators provided corresponding to the plural levels, to be operated by the user, and the reading unit reads out the card information corresponding to one of the plural operators.

Thus, when one operator is manipulated by the user, the card information corresponding to this operator is read out by the reading unit.

The IC card processor according to still another aspect of this invention comprises a nonvolatile memory which stores the state control information, an operator manipulated by the user when controlling the IC state, and a state control unit which controls the IC state, when the operator is manipulated, by issuing the state control information stored in the nonvolatile memory to the IC.

According to the above-mentioned aspect of this invention, only by manipulation of the operator, the state control information is issued to the IC by the state control unit, so that the IC state is controlled.

The IC card processor according to still another aspect of this invention comprises a nonvolatile memory which stores the first and second state control information, a first operator manipulated by the user when controlling the IC state in the first state, a second operator manipulated by the user when controlling the IC state in the second state, and a control unit which controls the IC state in the first state, when the first operator is manipulated, by issuing the first state control information stored in the nonvolatile memory to the IC, and controls the IC state in the second state, when the second operator is manipulated, by issuing the second state control information stored in the nonvolatile memory to the IC.

According to the above-mentioned aspect of this invention, when the first or second operator is manipulated, the first or second state control information corresponding to either one is issued to the IC, and the IC state is controlled in the first or second state.

The IC card processor according to still another aspect of this invention comprises a nonvolatile memory which stores the first and second state control information, an operator manipulated by the user when controlling the IC state in the first or second state, and a state control unit which controls the IC state in the first or second state, every time the operator is manipulated, by issuing the first state control information and second state control information alternately to the IC.

According to the above-mentioned aspect of this invention, since one operator has two functions, every time the operator is manipulated, the first or second state control information is issued to the IC, and the IC is controlled in the first or second state.

BRIEF DESCRIPTION OF THE DRAWINGS

FIG. 10 is a diagram showing display screen example in security mode change in the IC card processor in the second embodiment.

FIG. 15 is a diagram showing the memory content in an IC card used in an IC card processor in a third embodiment of the invention.

FIG. 16 is a diagram explaining security level in the IC card processor in the third embodiment.

FIG. 27 is a plan showing a configuration of other conventional IC card processor.

BEST MODE FOR CARRYING OUT THE INVENTION

Preferred embodiments of the IC card processor according to the present invention are described in detail accompanying with the drawings.

Figure 1:
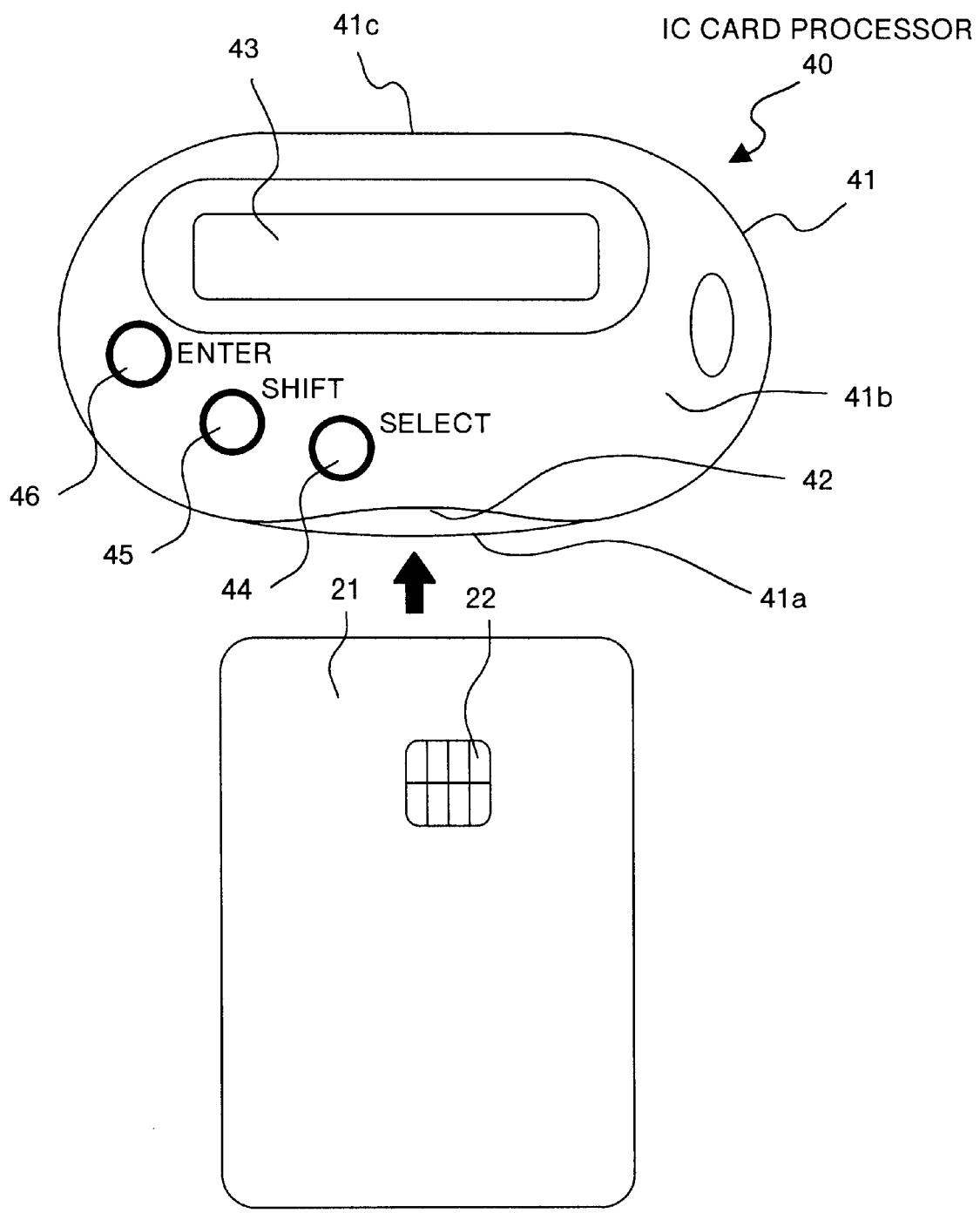
FIG. 1 is a plan showing an outline configuration of an IC card processor in a first embodiment of the invention.

FIG. 1 is a plan showing an outline configuration of an IC card processor 40 in a first embodiment of the invention. The outline configuration of the IC card processor 40 shown in the diagram is same as the outline configuration of the conventional IC card processor (see FIG. 21), but the functions are different and hence different reference numerals are used in FIG. 1.

Figure 21:
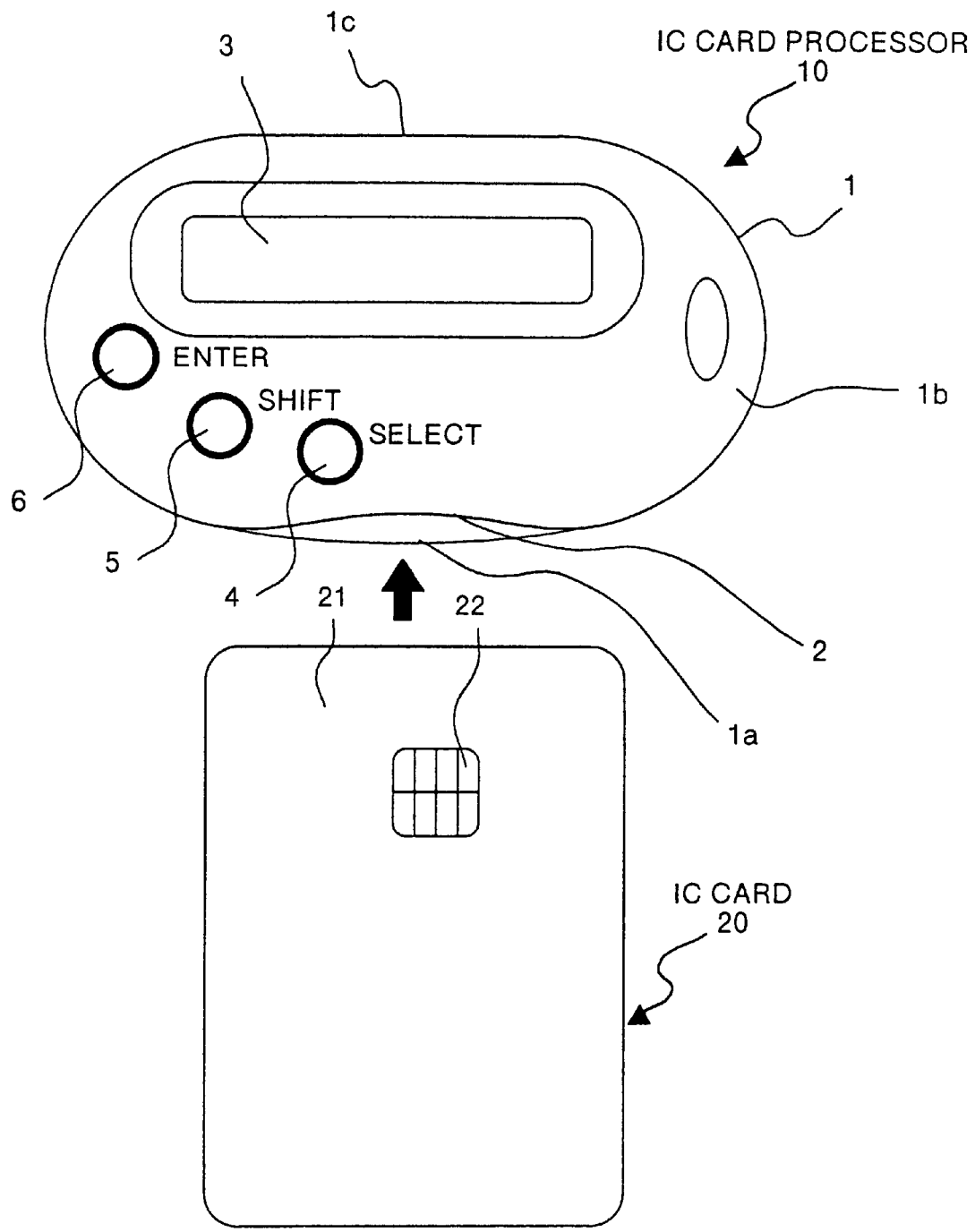
FIG. 21 is a plan showing an outline configuration of a conventional IC card processor.

That is, the IC card processor 40 in FIG. 1 comprises a main body 41, a display unit 43, a select key 44, a shift key 45, and an enter key 46, and these constituent elements correspond to the main body 1, display unit 3, select key 4, shift key 5, and enter key 6 shown in FIG. 21, respectively. A card inlet 42 in FIG. 1 corresponds to the card inlet 2 in FIG. 21, and it is formed in a slit in one side 41a of the main body 41 toward other side 41c, and one side of an IC card (see FIG. 21) is inserted into the card inlet 42. The display unit 43 is similar to the display unit 3 (see FIG. 21), and is provided on the surface 41b along the other side 41c of the main body 41.

Figure 2:
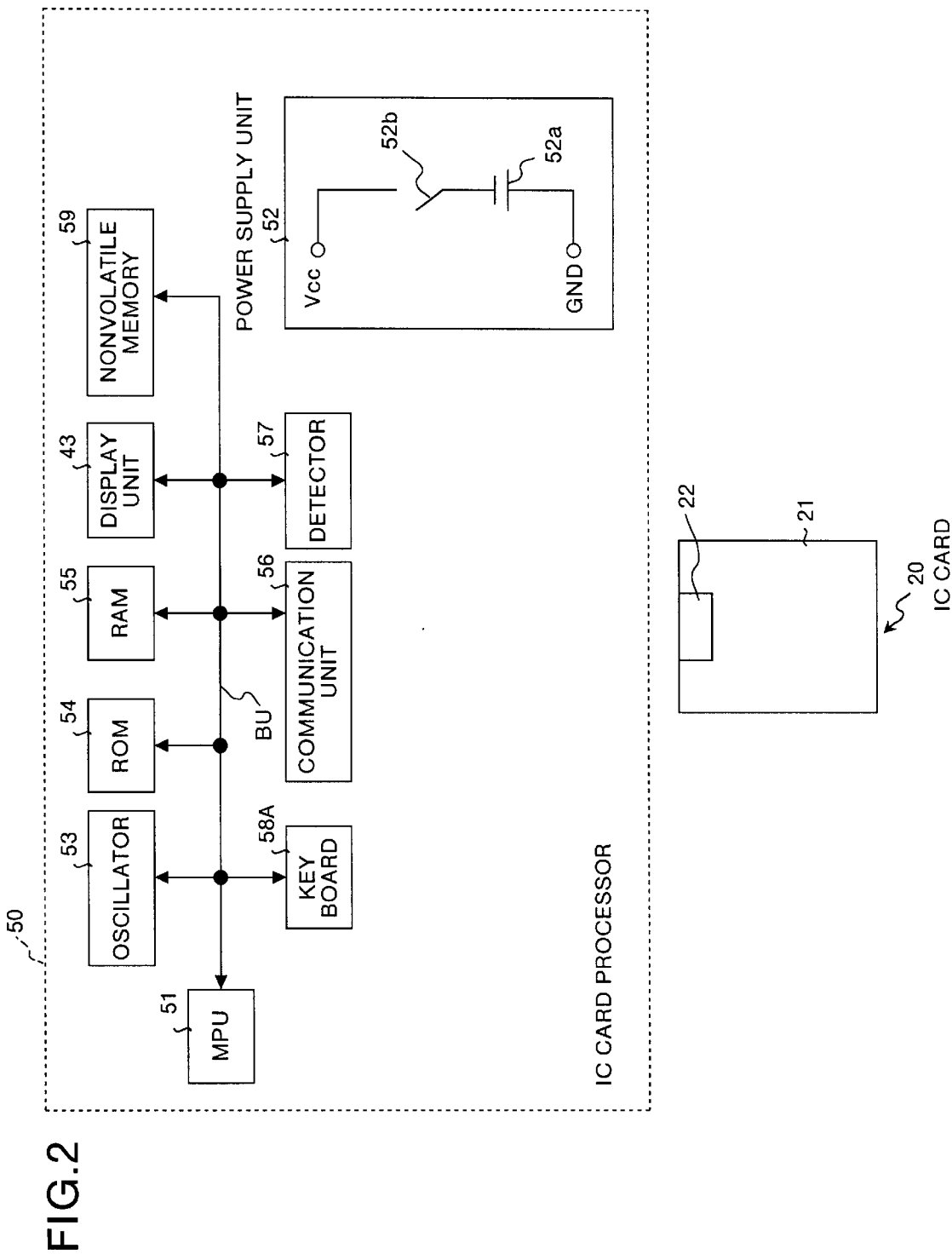
FIG. 2 is a block diagram showing an electric configuration of the IC card processor in the first embodiment.
Figure 22:
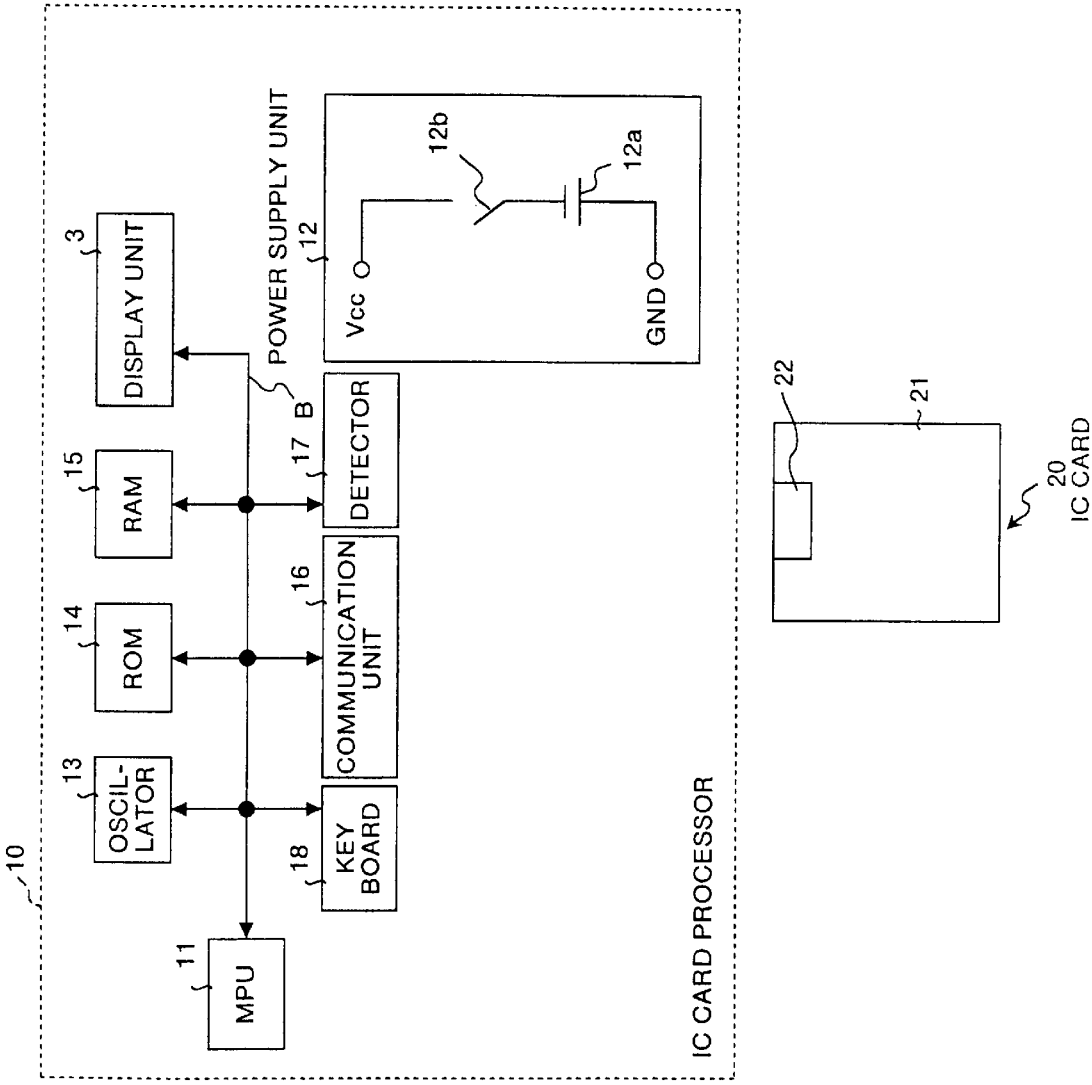
FIG. 22 is a block diagram showing an electric configuration of the conventional IC card processor.
Figure 23:
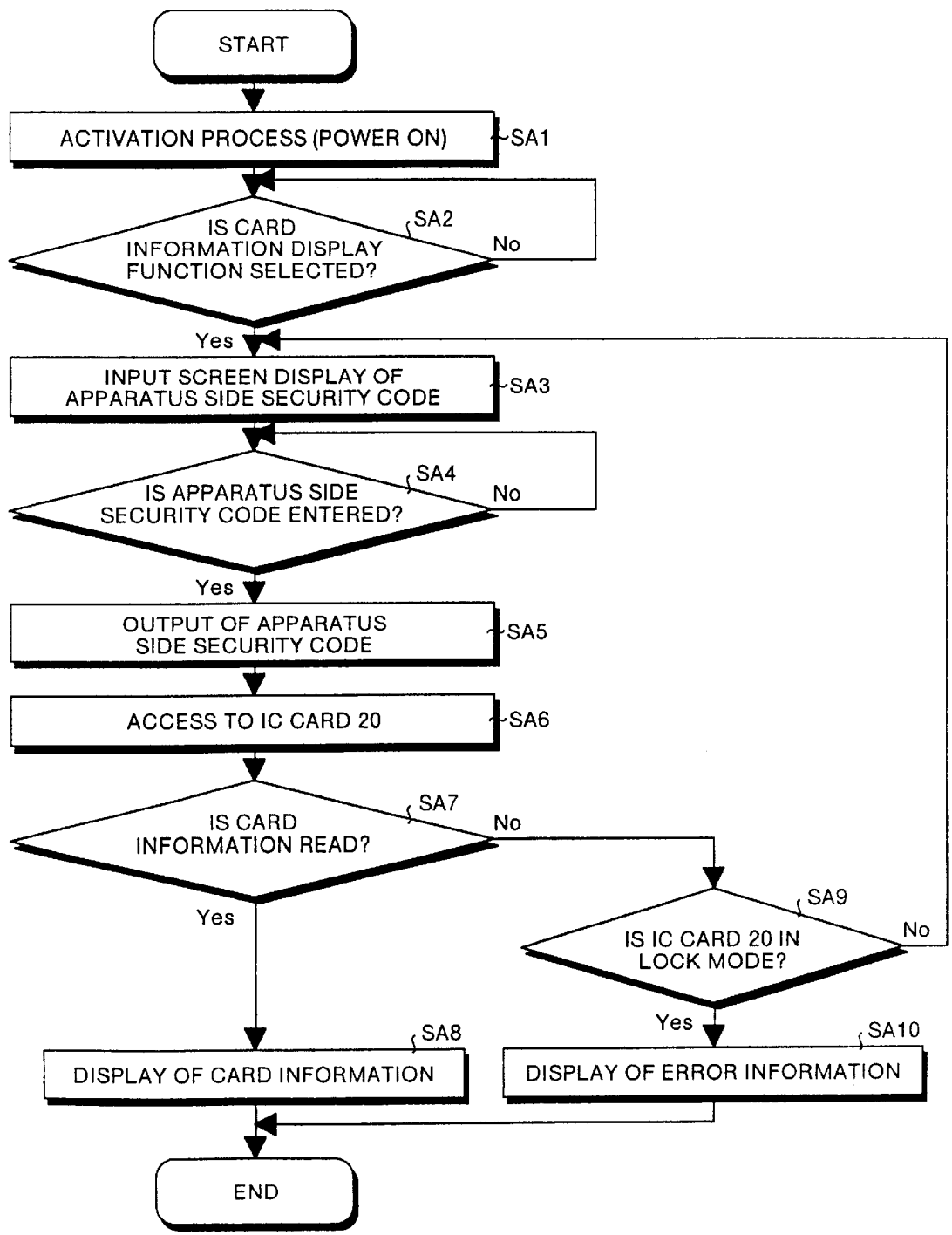
FIG. 23 is a flowchart explaining the card information display operation of the conventional IC card processor.
Figure 24:
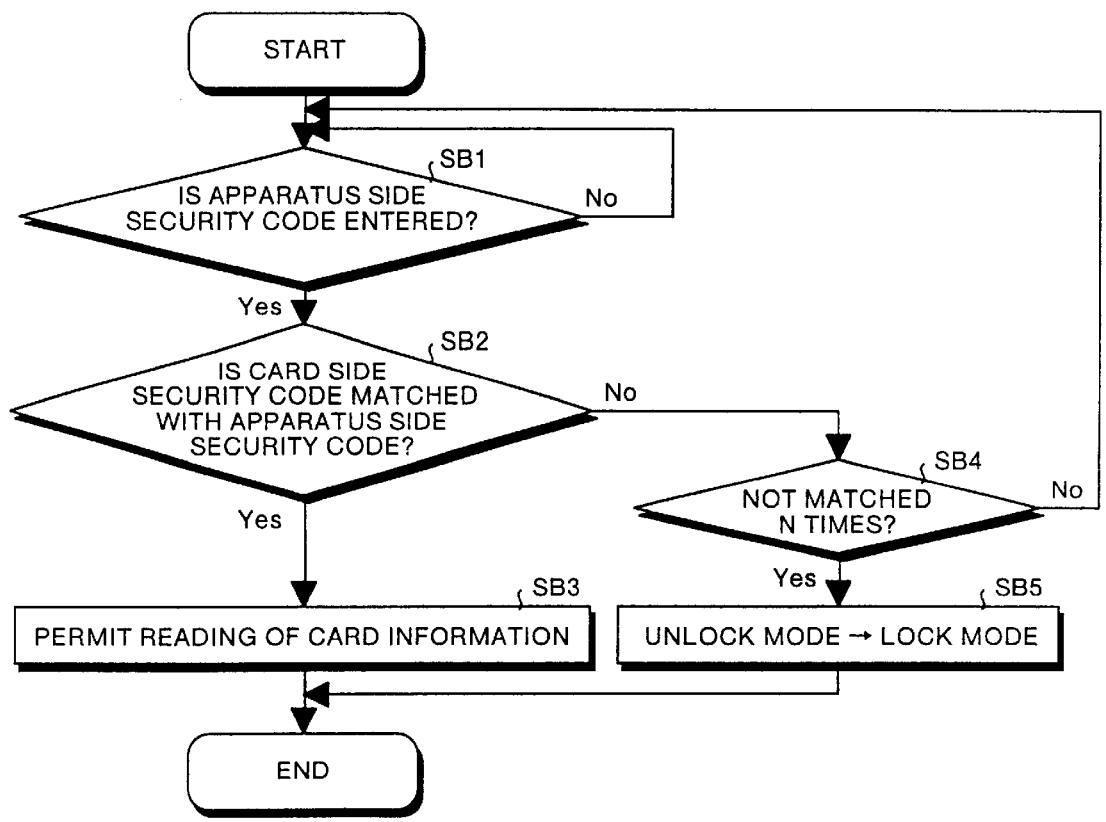
FIG. 24 is a flowchart explaining the operation of code collation in the IC shown in FIG. 21.
Figure 25:
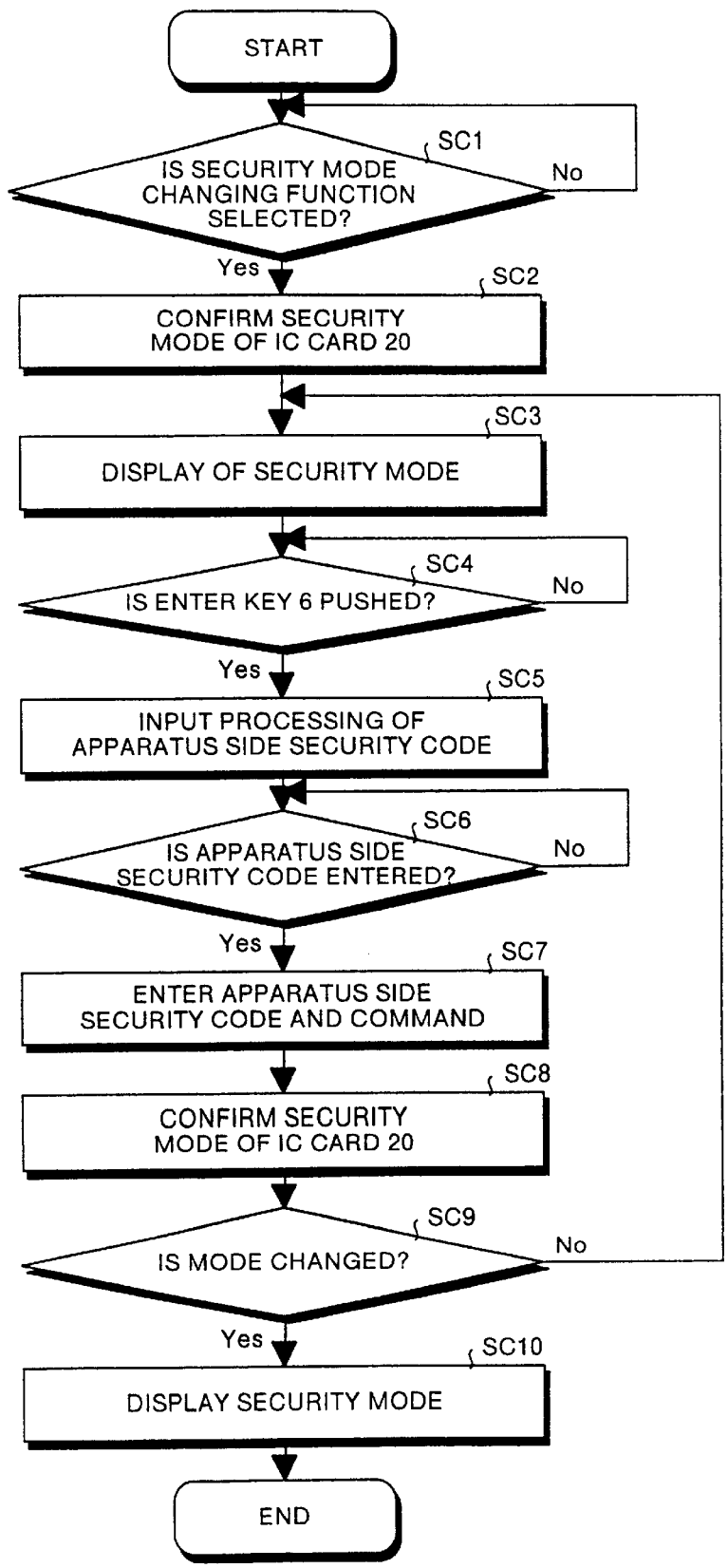
FIG. 25 is a flowchart explaining security mode changing operation of the conventional IC card processor.

FIG. 2 is a block diagram showing an electric configuration of the IC card processor 40. In the diagram, the parts corresponding to those in FIG. 1 are identified with same reference numerals and explanation is omitted. In FIG. 2, the constituent elements correspond to the constituent elements in FIG. 22, but a nonvolatile memory 59 is newly added.

In FIG. 2, an MPU 51 controls the parts of the apparatus, and the operation of the MPU 51 is explained in detail below. A power supply unit 52 is composed of a button-type battery 52a and a switch 52b connected in series. One end of the battery 52a is connected to vcc terminal through the switch 52b, and other end is connected to GND terminal, and an electric power is supplied to the parts of the apparatus and to the IC 22 when the IC card 20 is inserted into the card inlet 42 (see FIG. 1). The switch 52b is turned on or off by the MPU 51.

An oscillator 53 generates a clock of a specific frequency, and supplies it to necessary parts. A ROM 54 stores the application program for the IC card 20. This application program is executed by the MPU 51, and the program is for reading the card information stored in the EEPROM of the IC 22, and processing security and others.

A RAM 55 temporarily stores various data, variables and others occurring during execution of the application program by the MPU 51. A communication unit 56 is used for interface of communication between the IC 22 and MPU 51 when the IC card 20 (IC 22) is inserted into the card inlet 42 (see FIG. 1) and is connected electrically. A detector 57 detects the IC 22 electrically when the IC 22 is inserted into the card inlet 42. A keyboard 58A is composed of select key 44, shift 45, and enter key 46 shown in FIG. 1.

A nonvolatile memory 59 is, for example, an EEPROM, allowing reading of stored data and writing, and this memory does not lose its storage content if the power source is cut off. In the nonvolatile memory 59, the apparatus side security code is stored. These constituent elements including the MPU 51, oscillator 53, ROM 54 and nonvolatile memory 59 are mutually connected through a bus BU.

Figure 3:
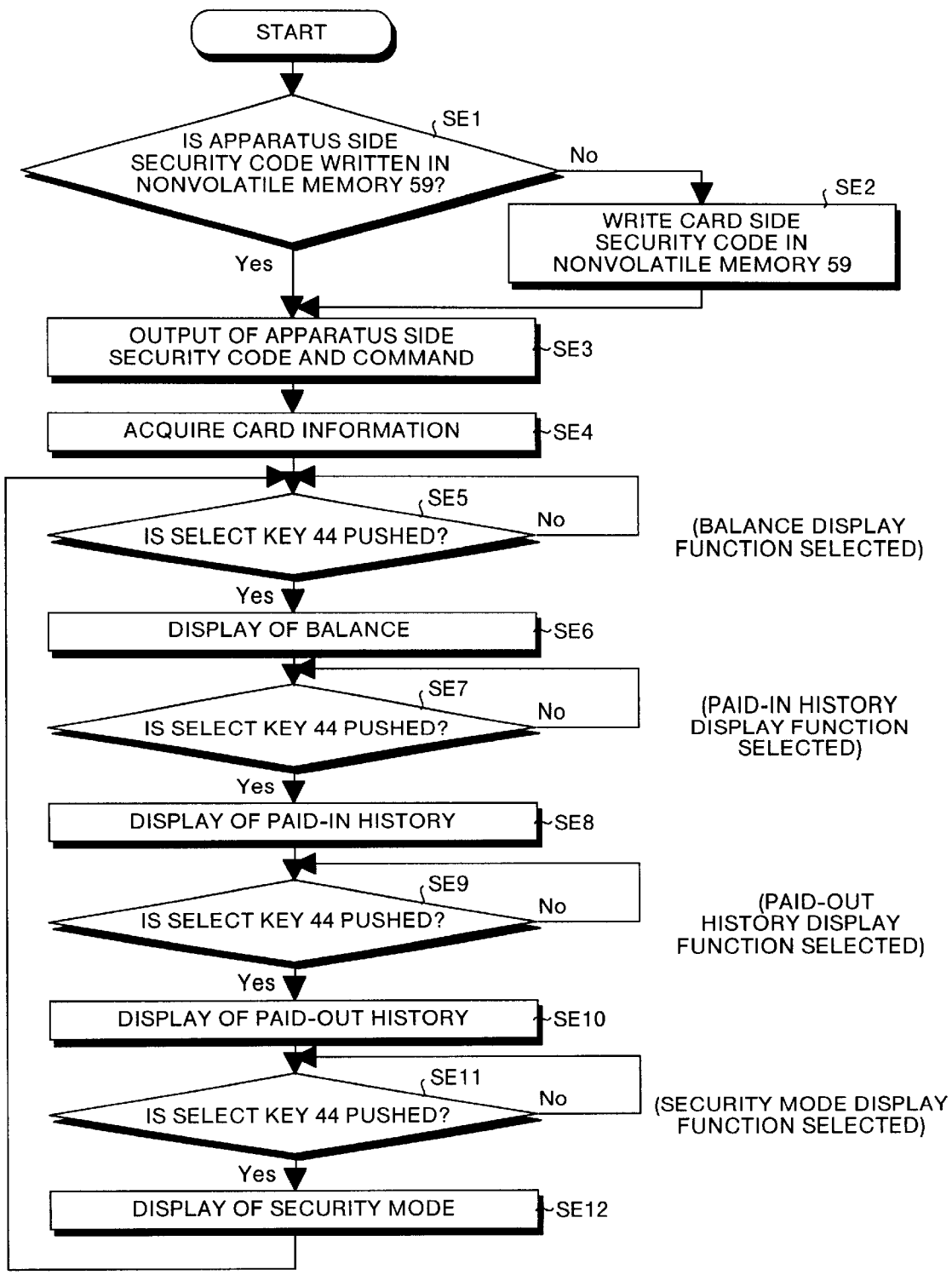
FIG. 3 is a flowchart explaining the operation of the IC card processor in the first embodiment.

The operation of the IC card processor 40 in the first embodiment having such configuration is explained by referring to the flowchart shown in FIG. 3. The IC card processor 40 shown in FIG. 2 is supposed to be in initial state, and in this initial state, therefore, it is supposed no data is stored in the nonvolatile memory 59. Further, the security mode of the IC card 20 is supposed to be in unlock mode.

In such initial state, when one side of the IC card 20 shown in FIG. 1 is inserted into the card inlet 42 by the user, the IC 22 and communication unit 56 shown in FIG. 2 are electrically connected, and the IC 22 is detected by the detector 57. From the detector 57, the detection result information is issued to the MPU 51 through the bus BU. As a result, the MPU 51 controls the power supply unit 52 to feed electric power to the IC 22, thereby executing the activation process. Then electric power is fed into the IC 22 from the power supply unit 52, and the IC 22 is activated.

In a specific time after supply of power, the IC 22 sends the initial response data to the MPU 51 through the communication unit 56 and bus BU. As a result, the MPU 51 advances to step SE1 shown in FIG. 3, and judges if the apparatus side security code is written in the nonvolatile memory 59, by accessing the nonvolatile memory 59 through the bus BU. In this case, because of the initial state, no data is stored in the nonvolatile memory 59, and the MPU 51 judges NO at step SE1, and goes to step SE2.

At step SE2, the MPU 51 accesses the IC 22 of the IC card 20 through the bus BU and communication unit 56, and reads out the held card side security code. Next, the MPU 51 writes the read card side security code into the nonvolatile memory 59 as apparatus side security code through the bus BU, and advances to step SE3. That is, at step SE2, after the IC card 20 is inserted, the apparatus side security code (=card side security code) is automatically written into the nonvolatile memory 59 without user's code input operation.

At step SE3, the MPU 11 first reads out the apparatus side security code from the nonvolatile memory 59 through the bus BU. Then the MPU 51 issues the read apparatus side security code and the command for reading the card information of the IC card 20 to the IC 22 through the bus BU and communication unit 56, and advances to step SE4. When the apparatus side security code and command are entered, the IC 22 operates same as mentioned above, first collating the held card side security code and the entered apparatus side security code. In this case, since the apparatus side security code and card side security code are the same, the IC 22 maintains the unlock mode.

At step SE4, the MPU 11 accesses the IC 22 (IC card 20) through the bus BU and communication unit 56, and acquires the card information. Next, the MPU 51 stores the card information temporarily in the RAM 55, and advances to step SE5. Herein, the card information includes the balance information, paid-in history information, paid-out history information, and security mode (unlock mode) information of the IC card 20.

At step SE5 to step SZE12, the MPU 51 processes by displaying the information selected by the user's function selection result, sequentially in the display unit 43. For example, the functions include the balance display function for showing the balance information in the display unit 43, paid-in history information for displaying the paid-in history information, paid-out display function for displaying the paid-out history information, and security mode display function for displaying the security mode of the IC card 20. The number and kinds of functions can be easily changed by revising the design of the program stored in the ROM 54.

Specifically, at step SE5, the MPU 51 judges if the select key 44 (see FIG. 1) is pushed by the user or not, in other words, if the balance display function is selected or not, and if judged NO, the same judgment is repeated. When the user pushes the select key 44 to select the balance display function, the MPU 51 judges YES at step SE5, and goes to step SE6. At step SE6, the MPU 51 extracts the balance information from the card information stored in the RAM 55, and shows it in the display unit 43, and then goes to step SE7.

At step SE7, the MPU 51 judges, same as at step SE5, if the select key 44 is pushed by the user or not, in other words, if the next paid-in history display function is selected or not. When the select key 44 is pushed by the user, the MPU 51 judges YES at step SE7, and advances to step SE8, and in the same operation as mentioned above, the paid-in history information extracted from the card information is shown in the display unit 43, and the process goes to step SE9.

At step SE9, the MPU 51 judges, same as at step SE5, if the select key 44 is pushed by the user or not, in other words, if the next paid-out history display function is selected or not. When the select key 44 is pushed, the MPU 51 judges YES, and advances to step SE10. At step SE10, the MPU 51 shows the paid-out history information extracted from the card information in the display unit 43, and goes to step SE11.

At step SE11, the MPU 51 judges, same as at step SE5, if the select key 44 is pushed by the user or not, in other words, if the next security mode display function is selected or not, and when the select key 44 is pushed, the MPU 51 judges YES, and advances to step SE12. At step SE12, the MPU 51 shows the security mode (in this case, unlock mode) extracted from the card information in the display unit 43, and returns to step 5E5, and the same process is repeated as far as the IC card is being inserted. Thus, every time the user pushes the select key 44, the information is shown on the display screen of the display unit 43 sequentially such as balance information, paid-in history information, paid-out history information, and security mode.

After confirming the card information, when the user draws out the IC card from the card inlet 42, the power supply from the power supply unit 42 is cut off, but the apparatus side security code stored in the nonvolatile memory 59 is stored and held in the nonvolatile memory 59.

In the case the apparatus side security code has been already written into the nonvolatile memory 59 by the process at step SE2, when the IC card 20 is inserted again into the card inlet 42 (see FIG. 1), at step SE1, the MPU 51 judges YES, and goes to step SE3, and the same process is repeated until the IC card 20 is drawn out from the card inlet 42 (see FIG. 1).

As explained herein, according to the IC card processor 40 of the first embodiment, having the nonvolatile memory 59, the card side security code held in the IC 22 is automatically stored in the nonvolatile memory 59 as apparatus side security code when the IC card 20 is inserted in the initial state, and therefore the user does not have to enter the apparatus side security code every time by manual input. Therefore, in the IC card processor 40 of the first embodiment, since the labor of code input is saved, the convenience for the user is enhanced.

Moreover, according to the IC card processor 40 of the first embodiment, when the apparatus side security code is written into the nonvolatile memory 59 automatically, since the IC card 20 and the IC card processor 40 are related with each other one to one inseparably, if the user forgets the apparatus side security code, the card information of the IC card 20 can be checked.

Figure 4:
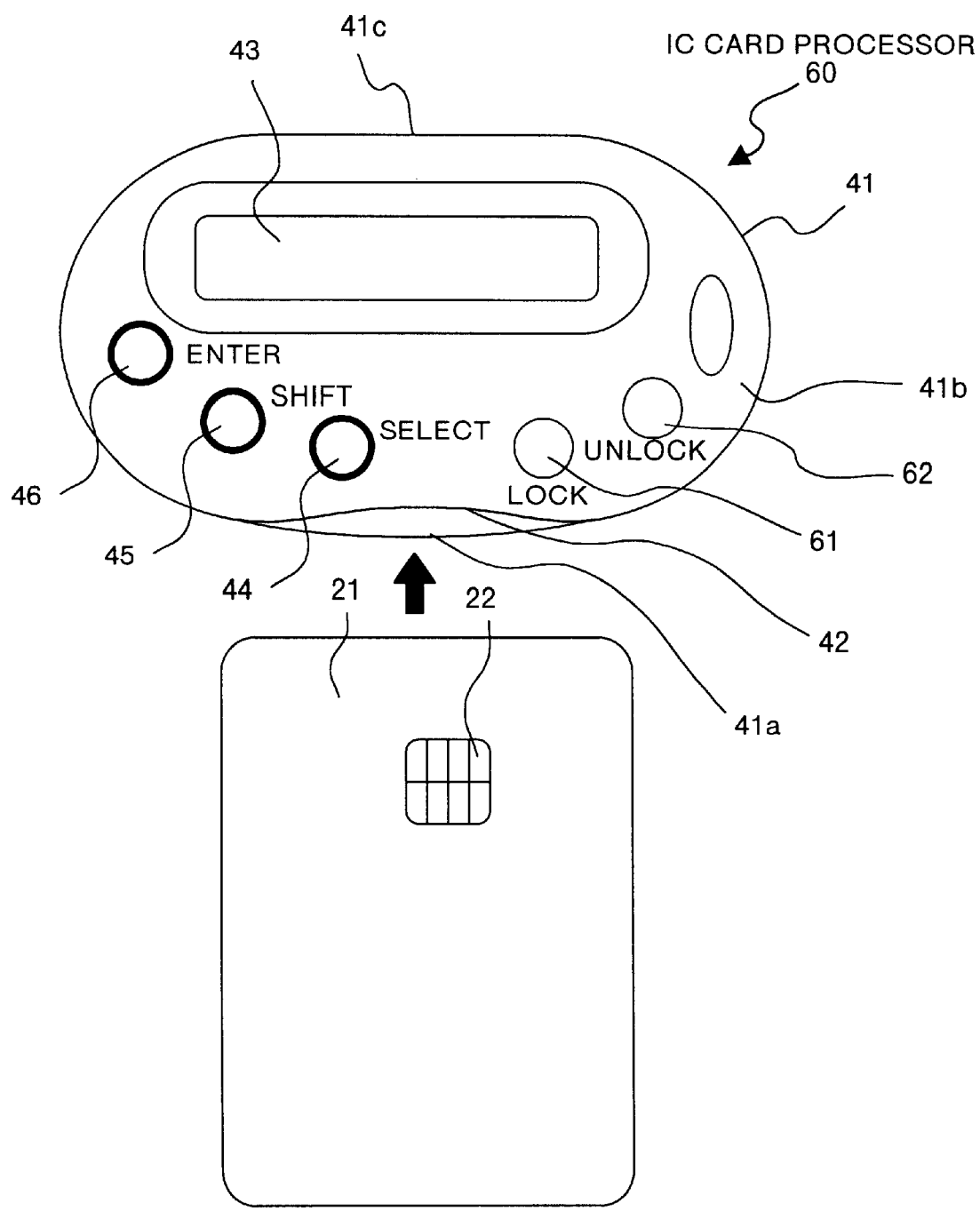
FIG. 4 is a plan showing an outline configuration of an IC card processor in a second embodiment of the invention.

FIG. 4 is a plan showing an outline configuration of an IC card processor 60 in a second embodiment of the invention. In the diagram, the same parts as in FIG. 1 are identified with same reference numerals and their explanation is omitted. In the IC card processor 60 shown in FIG. 4, a lock key 61 and an unlock key 62 are newly provided.

The lock key 61 is provided on the surface 41b of the main body 41, near one side 41a, and it is the key to be pushed when the user wishes to set the security mode of the IC card 20 in the lock mode. The unlock key 62 is provided on the surface 41b, near the lock key 61, and it is the key to be pushed when the user wishes to set the security mode in the unlock mode.

Explaining the security mode again to make sure, the unlock mode in the security mode is the usable state of the IC card 20, that is, an accessible state for allowing reading and writing of card information from the IC card processor 60 to the IC card 20 (IC 22). The lock mode is the unusable state of the IC card 20 in the IC card processor 60, that is, an inaccessible state not allowing reading or writing of card information from the IC card processor 60 to the IC card 20 (IC 22).

Figure 5:
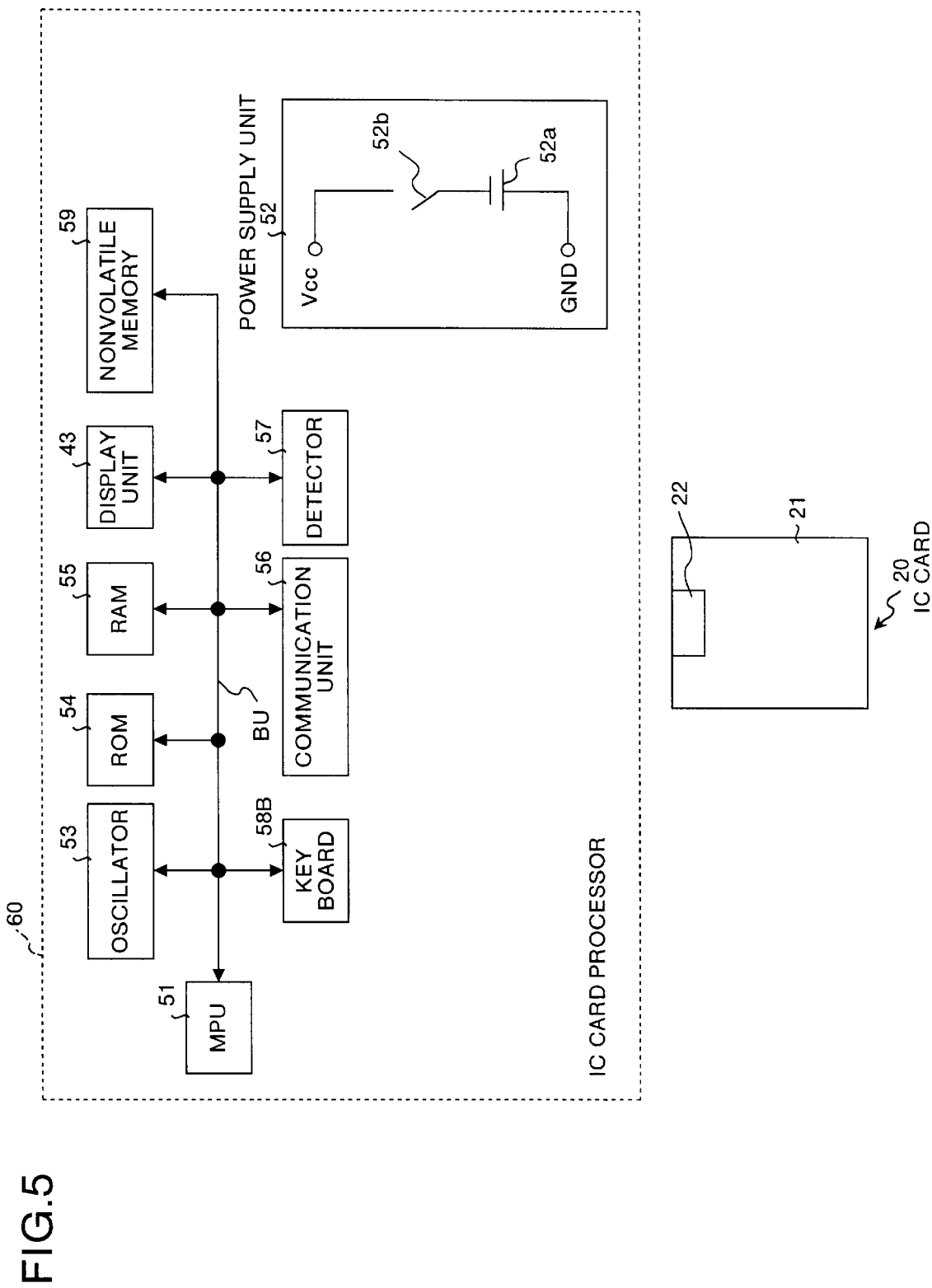
FIG. 5 is a block diagram showing an electric configuration of the IC card processor in the second embodiment.

FIG. 5 is a block diagram showing an electric configuration of the IC card processor 60. In the diagram, the same parts as in FIG. 2 are identified with same reference numerals and their explanation is omitted. In FIG. 4, instead of the keyboard 58A in FIG. 2, a keyboard 58B is provided. This keyboard 58B includes a lock key 61 and an unlock key 62, in addition to the select key 44, shift key 45, and enter key 46 shown in FIG. 4.

Figure 6:
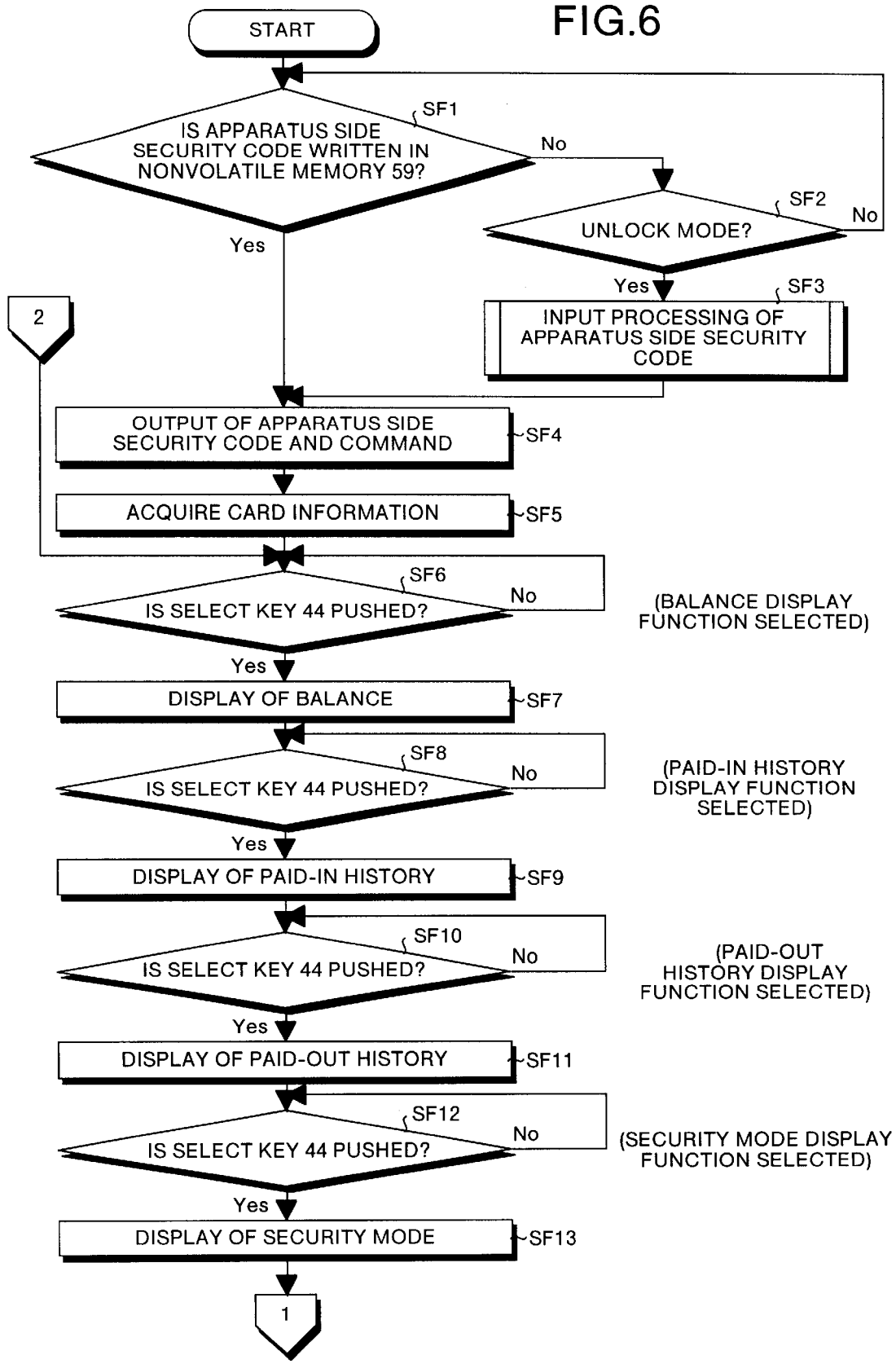
FIG. 6 is a flowchart explaining the operation of the IC card processor in the second embodiment.
Figure 7:
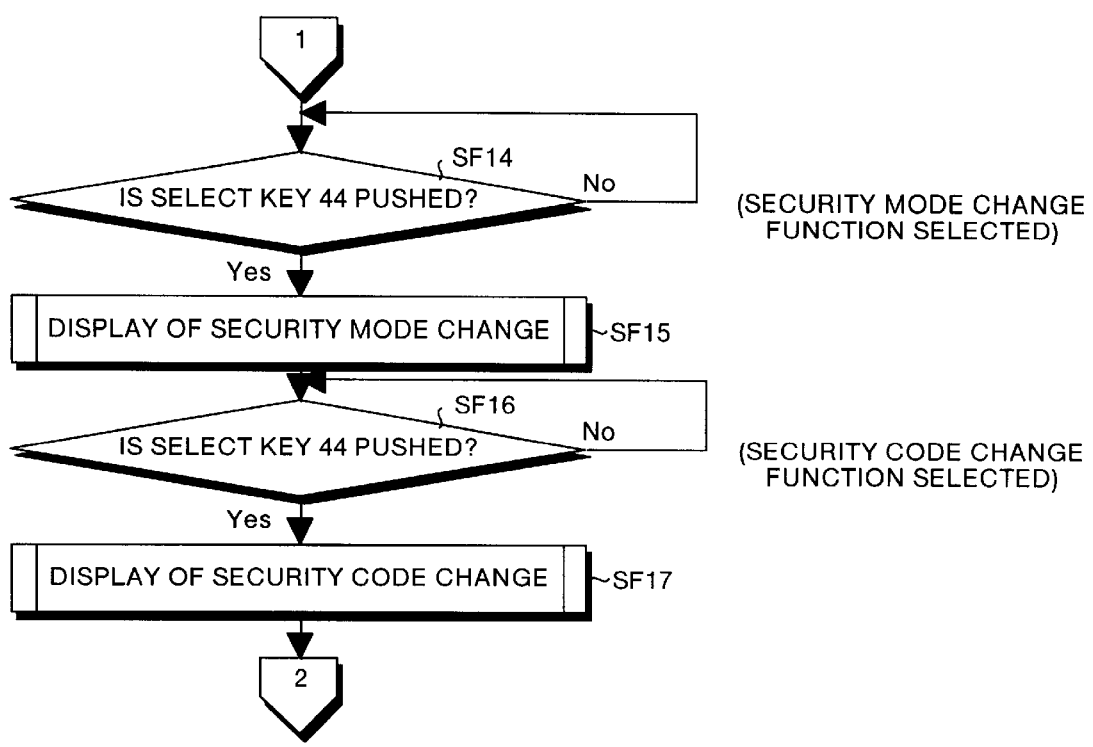
FIG. 7 is a flowchart explaining the operation of the IC card processor in the second embodiment.

The operation of the IC card processor 60 in the second embodiment having such configuration is explained by referring to the flowcharts shown in FIG. 6 and FIG. 7. Herein, relating to the correspondence of the flowcharts shown in FIG. 6 and FIG. 7 and the flowchart shown in FIG. 3, step SF1, and step SF4 to step SF13 shown in FIG. 6 correspond one by one to step SE1, and step SE3 to step SE12 shown in FIG. 3, and their detailed description is omitted. That is, in FIG. 6, step SF2 and step SF3 are added in instead of step SE2 in FIG. 3, and in FIG. 7, step SF14 to step SF17 are newly added.

The IC card processor 60 shown in FIG. 5 is supposed to be in initial state, and in this initial state, therefore, it is supposed no data is stored in the nonvolatile memory 59. Further, the security mode of the IC card 20 is supposed to be in unlock mode.

In such initial state, when one side of the IC card 20 shown in FIG. 4 is inserted into the card inlet 42 by the user, the IC 22 and communication unit 56 shown in FIG. 5 are electrically connected, and the IC 22 is activated as the electric power is supplied from the power supply unit 52 in the process of the operation as mentioned above.

In a specific time, when the IC 22 sends the initial response data to the MPU 51 through the communication unit 56 and bus BU, the MPU 51 advances to step SF1 shown in FIG. 6, and judges if the apparatus side security code is written in the nonvolatile memory 59 or not in the same process as at step SE1 (see FIG. 3). In this case, since no data is stored in the nonvolatile memory 59, and the MPU 51 judges NO at step SF1, and goes to step SF2.

At step SF2, the MPU 51 accesses the IC 22 of the IC card 20 through the bus BU and communication unit 56, and reads the status information of the IC 22, and judges from this status information whether the security mode of the IC is unlock mode or not. As mentioned above, since the IC card 20 is in unlock mode, the MPU 51 judges YES at step SF2, and goes to step SF3. On the other hand, if the security mode of the IC card 20 is the lock mode, the MPU 51 judges NO at step SF2, and returns to step SF1.

Figure 8:
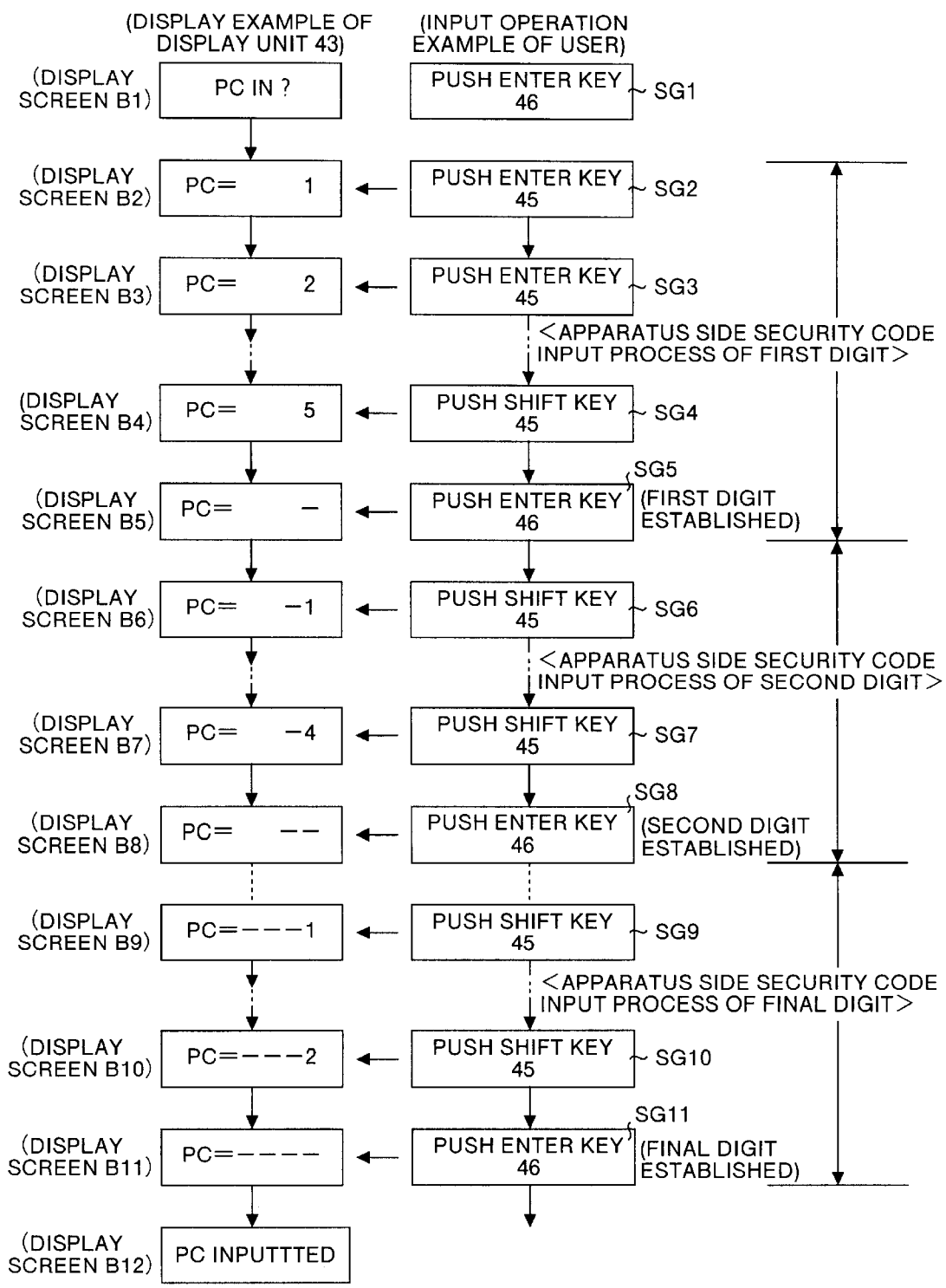
FIG. 8 is a diagram explaining apparatus side security code input process in the IC card processor in the second embodiment.
Figure 26:
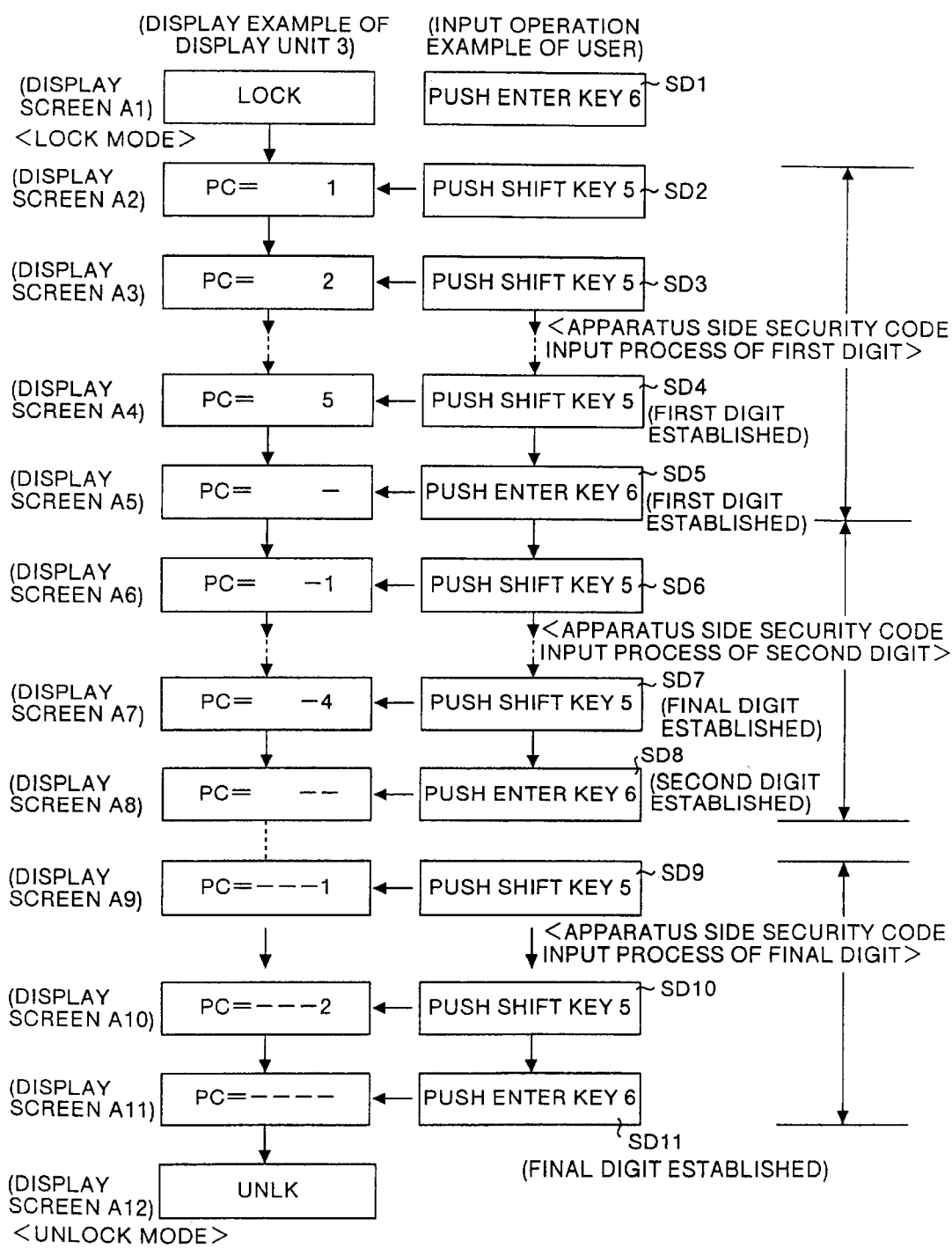
FIG. 26 is a diagram explaining security code input operation of the conventional IC card processor.

At step SF3, when the user enters the apparatus side security code, the MPU 51 executes the apparatus side security code input process for storing in the nonvolatile memory 59. Specifically, as shown in FIG. 8, the MPU 51 first shows a character string "PC IN?" (display screen B1)

in the display unit 43. Herein, "PC IN?" urges the user to enter the apparatus side security code. Suppose the user enters a four-digit code "5432" as the apparatus side security code. The input procedure of the apparatus side security code explained below is the same as the procedure explained by referring to FIG. 26.

Observing "PC IN?" on the display screen B1, the user goes to step SG1 to enter the first digit numeral (5) of the apparatus side security code, and pushes the enter key 46 (see FIG. 4), and pushes the shift key 45 (see FIG. 4) at step SG2. As a result, the display screen of the display unit 43 is changed from display screen B1 to display screen B2 by the control of the MPU 51, and a character-numeral string of "PC=1" (display screen B2) appears in the display unit 43 same as the display screen A2 in FIG. 26.

Consequently, when the user pushes the shift key 45 four times in total at steps SG3 and SG4, the numeral of the first digit of the apparatus side security code is shifted every time the shift key 45 is pressed, that is, "PC=2" (display screen B3), . . . , and "PC=5" (display screen B4). Next, at step SG5, when the user pushes the enter key 46, the numeral of the first digit (5) of the apparatus side security code is established (see display screen B5).

At step SG6 to step SG7, when the user pushes the shift key 45 successively, the numeral of the second digit of the apparatus side security code is changed from "PC=-1" (display screen B6), . . . , "PC=-4" (display screen B7), every time the shift key 45 is pushed. At next step SG8, when the user pushes the enter key 46, the second digit numeral (4) of the apparatus side security code is established (see display screen B8). Hereinafter, by the key operation by the user, the numerals of the third and subsequent digits of the apparatus side security code are entered successively.

At step SG10, when the shift key 45 is pushed, the display unit 43 shows the numeral-character string "PC=—2" (display screen B10), and the user pushes the enter key 45 at step SG11 in order to set the numeral of the final digit (in this case, fourth digit) Thus, the display unit 43 shows a character string "PC=—" (display screen B1), and the input of the four-digit apparatus side security code (5432) is completed.

At the same time, the MPU 51 shows a character string "PC INPUTTED" (display screen B12) in the display unit 43 in order to inform the user of completion of input of the apparatus side security code. Next, the MPU 51 writes the entered apparatus side security code (5432) into the nonvolatile memory 59 through the bus BU, and finishes the input process of apparatus side security code, and the goes to step SF4 shown in FIG. 6.

At step SF4, the MPU 51, same as at step SE3 (see FIG. 3), reads out the apparatus side security code from the nonvolatile memory 59 through the bus BU. Next, the MPU 51 issues the read apparatus side security code and the command for reading the card information of the IC card 20 (IC 22) to the IC 22 through the bus BU and communication unit 56, and goes to step SF5. When the apparatus side security code and command are entered, the IC 22 first collates the held card side security code and the entered apparatus side security code. Supposing the result of collation is matched, the IC 22 maintains the unlock mode.

At step SF5, the MPU 51 accesses the IC 22 (IC card 20) through the bus BU and communication unit 56, and acquires the card information (balance information, paid-in history information, paid-out history information, security mode, etc.).

At the following step SF6 to SF13, the MPU 51 processes same as at step SE5 to step SE12 (see FIG. 3), by sequentially displaying the selected information in the display unit 43 depending on the function selection result by the user.

When the process at step SF13 shown in FIG. 6 is over, the MPU 51 goes to step SF14 shown in FIG. 7. At step SF14, the MPU 51 judges if the select key 44 is pushed by the user or not, that is, if the next security mode changing function is selected or not, and if judged NO, the same judgment is repeated. Herein, the security mode changing function is to change the security mode from the unlock mode to the lock mode, or from the lock mode to the unlock mode intentionally by the user's manipulation.

When the user pushes the select key 44 in order to change the security mode of the IC card 20 from the present unlock mode to the lock mode, the MPU 51 judges YES at step SF14, and goes to step SF15. At step SF15, the MPU 51 recognizes the security mode of the present IC card 20 from the status information, and shows it in the display unit 43.

In this case, since the security mode is the unlock mode, the display unit 43 shows a character string "UNLK" as shown on display screen D1 in FIG. 10. Herein, "UNLK" means the unlock mode, and the user observes the display screen D1 and recognizes the present security mode. Next, the MPU 51 executes the security mode changing process in order to change the security mode of the IC card 20.

Figure 9:
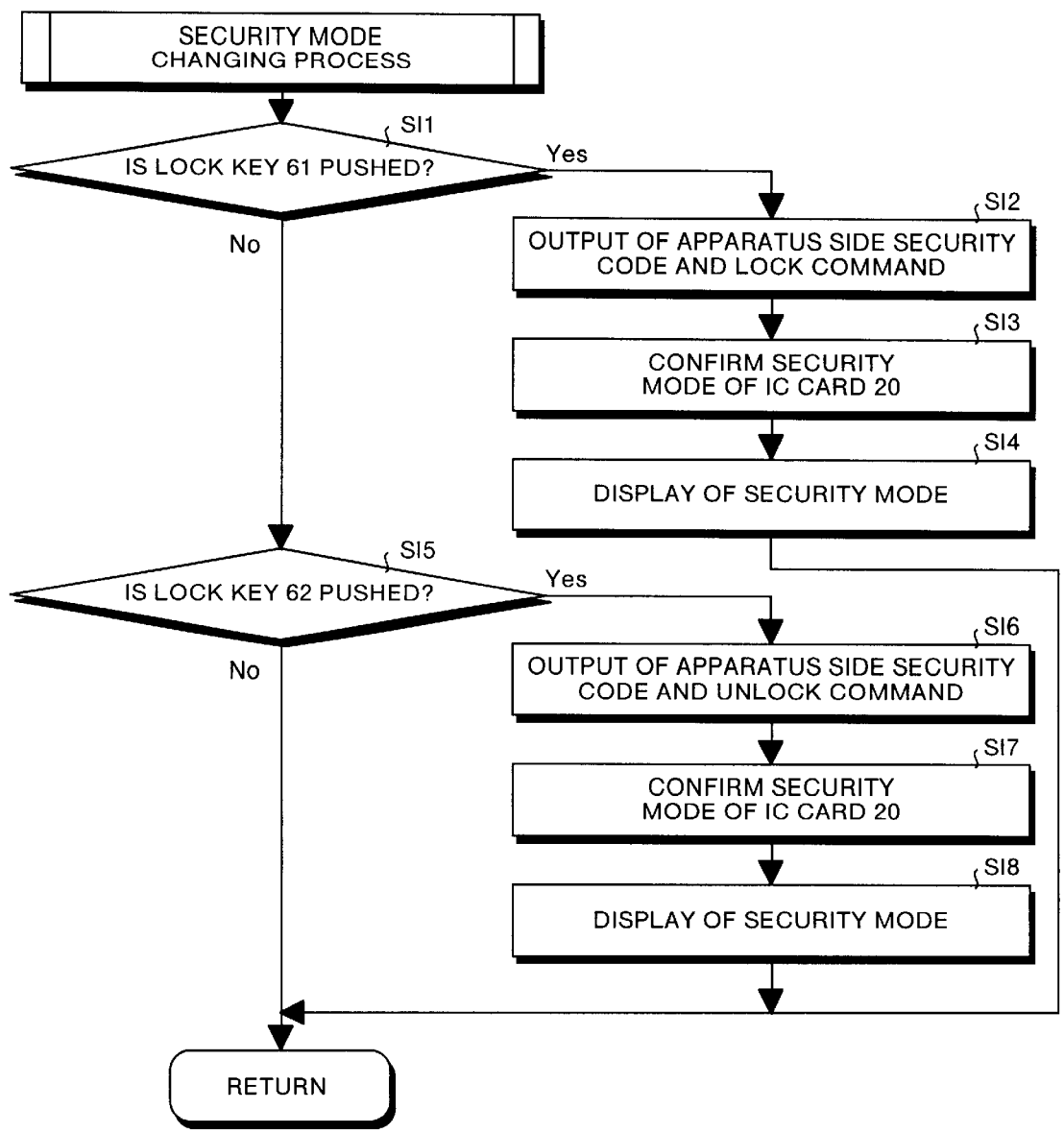
FIG. 9 is a diagram explaining security mode changing process in the IC card processor in the second embodiment.

Referring to the flowchart in FIG. 9, the security mode changing process is described in detail. At step SI1 shown in the flowchart, the MPU 51 judges if the lock key 61 (see FIG. 4) is pushed or not. In this case, suppose to change the security mode of the IC card 20 from the unlock mode to the lock mode, and the user pushes the lock key 61. As a result, the MPU 51 judges YES at step SI1, and goes to step SI1.

At step Si2, first, the MPU 51 reads out the apparatus side security code stored at step SF3 from the nonvolatile memory 59 through the bus BU. Next, the MPU 51 issues the apparatus side security code and the lock command for instructing to change the security mode to the lock mode to the IC 22, to the IC 22 through the bus BU and communication unit 56, and advances to step SI3.

When the apparatus side security code and lock command are entered, the IC 22, same as in the above operation, collates the apparatus side security code and the held card side security code. Supposing to be matched, in this case, the IC 22 changes the security mode from the present unlock mode to the lock mode according to the lock command. If not matched, on the other hand, the IC 22 maintains the present security mode (in this case, the unlock mode) without changing the security mode.

At step SI3, the MPU 51 confirms the present security mode (lock mode) from the status information, and advances to step S14. At step S14, the MPU 51 shows confirmed lock mode in the display unit 43, and after finishing the security mode changing process, advances to step SF16 shown in FIG. 7. In this case, since the present security mode has been changed to the lock mode, the display screen of the display unit 43 is changed from the display screen D1 shown in FIG. 10 (UNLK) to the display screen D2 (LOCK). The character string "LOCK" means that the security mode of the IC card 20 is the lock mode. Therefore, the user observes the display screen D2, and recognizes that the security mode of the IC card 20 has been changed from the unlock mode to the lock mode.

To the contrary, when changing the security mode from the lock mode to the unlock mode, at step SI1 shown in FIG. 9, the lock key 61 is not pushed, and hence the MPU 51 judges NO at step SI1, and advances to step SI5. At step Si5, judging if the unlock key 62 (see FIG. 4) has been pushed by the user or not, and when judged NO, the security mode changing process is terminated, and the process goes to step SF16 shown in FIG. 7.

In this case, in the case the security mode of the IC card 20 is the lock mode, and when changing the security mode from the lock mode to the unlock mode, the user pushes the unlock key 62. As a result, the MPU 51 judges YES at step SI5, and goes to step SI6.

At step SI6, first, the MPU 51 reads out the apparatus side security code from the nonvolatile memory 59 through the bus BU. Next, the MPU 51 issues the apparatus side security code and the unlock command for instructing to change the security mode to the unlock mode to the IC 22, to the IC 22 through the bus BU and communication unit 56, and advances to step SI7.

When the apparatus side security code and unlock command are entered, the IC 22, same as in the above operation, collates the apparatus side security code and the held card side security code. Supposing to be matched, in this case, the IC 22 changes the security mode from the present lock mode to the unlock mode according to the unlock command. If not matched, on the other hand, the IC 22 maintains the present security mode (in this case, the lock mode) without changing the security mode.

At step SI7, the MPU 51 confirms the present security mode (unlock mode) from the status information, and advances to step S18. At step S18, the MPU 51 shows confirmed unlock mode in the display unit 43, and after finishing the security mode changing process, advances to step SF16 shown in FIG. 7. In this case, since the present security mode has been changed to the unlock mode, the display screen of the display unit 43 is changed from the display screen D2 shown in FIG. 10 (LOCK) to the display screen D1 (UNLK), contrary to the above case.

At step SF16 shown in FIG. 7, the MPU 51 judges if the select key 44 is pushed by the user or not, that is, if the next security code changing function has been selected or not, and when judged NO, the same judgment is repeated. The security code changing function is a function for changing the apparatus side security code already stored in the nonvolatile memory 59 at step SF3 (see FIG. 6).

Figure 11:
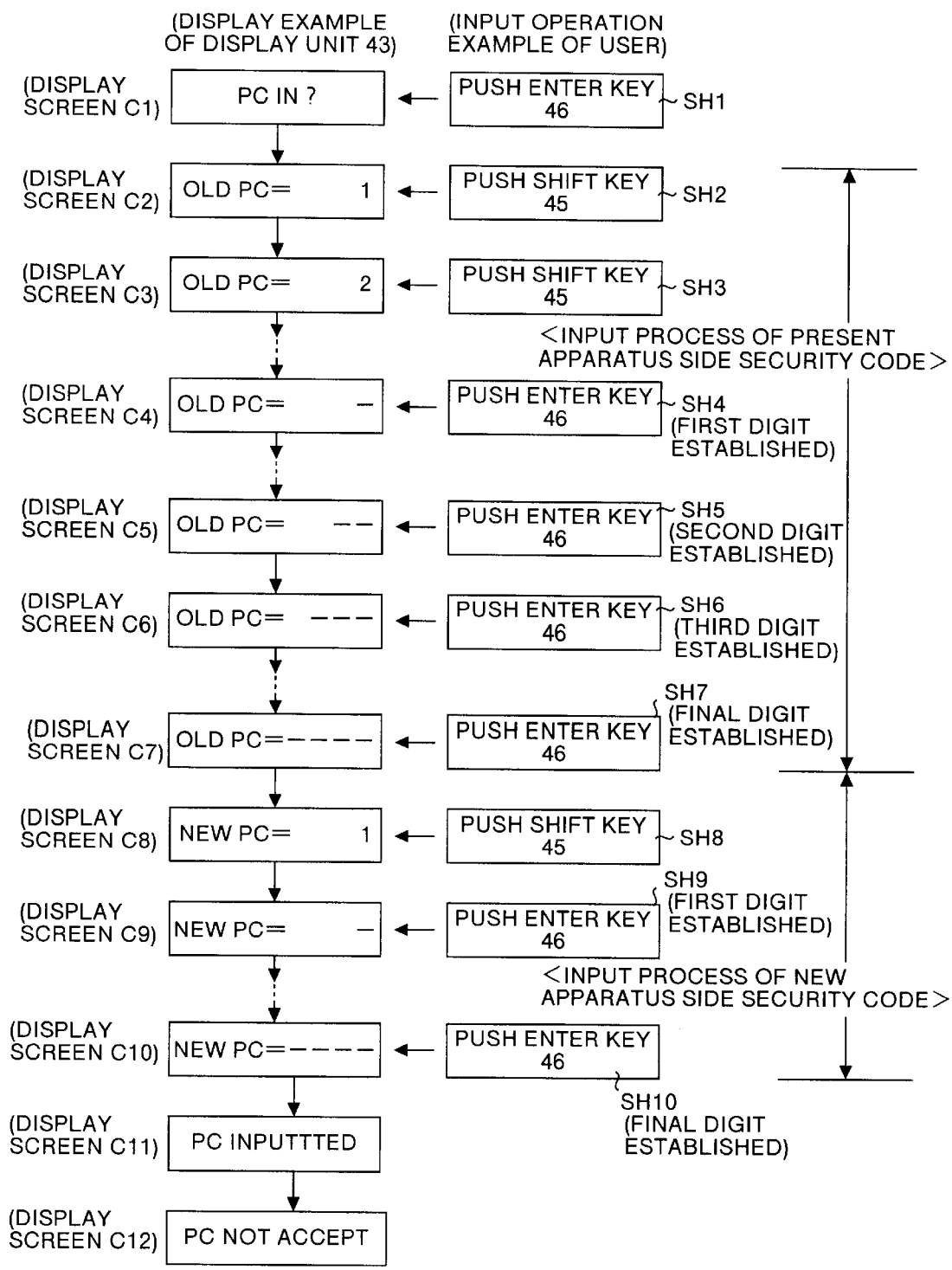
FIG. 11 is a diagram explaining security code changing process in the IC card processor in the second embodiment.

Suppose the user pushes the select key 44 at step SF16 in order to change the present apparatus side security code from the present "5432" to, for example, "2345," the MPU 51 judges YES at step SF16, and goes to step SF17, and shows a character string "PC=IN?" in the display unit 43 as shown in the display screen C1 in FIG. 11, and executes the security code changing process. Herein, "PC IN?" urges the user to enter the apparatus side security code as mentioned earlier.

The detail of the security code changing process is explained by referring to FIG. 11. The user, observing the display screen C1 "PC IN?" advances to step SH1 in order to enter the first digit numeral (5) of the present apparatus side security code (before change), and pushes the enter key 46 (see FIG. 4), and pushes the shift key 45 (see FIG. 4) at step SH2. As a result, the display screen of the display unit 43 is changed from the display screen C1 to the display screen C2 by the control of the MPU 51, and the display unit shows a character-numeral string "OLD PC=1".

Herein, "OLD PC" means the present apparatus side security code (before change), and "1" denotes the numeral of the first digit of the present security code.

At step SH3 to step SH7, when the user pushes the shift key 45 (enter key 46) sequentially, in the same operation as mentioned above, the first to final digit numerals (5, 4, 3, 2) of the present apparatus side security code are established. At step SH7, when the final digit numeral (2) is established, the MPU 51 recognizes "5432" as the present apparatus side security code.

Next, the MPU 51 collates the apparatus side security code stored in the nonvolatile memory 59 and the entered apparatus side security code. When not matched as a result of collation, "PC NOT ACCEPT" (display screen C12) is shown in the display unit 43 as code input error, and the security code changing process is terminated, returning to step SF6 in FIG. 6, and the same process is repeated.

If matched, the MPU 51 shows a character-numeral string "NEW PC=1" (display screen C8) in the display unit 43. Herein, "NEW PC" denotes a new apparatus side security code (after change), and "1" means the numeral of the first digit of the new security code.

At step SH8 to step SH10, when the user pushes the shift key 45 (enter key 46) sequentially, in the same operation as mentioned above, the first to final digit numerals (2, 3, 4, 5) of the new apparatus side security code are established. At step SH10, when the final digit numeral (5) is established, the MPU 51 recognizes "2345" as the new apparatus side security code. As a result, the MPU 51 shows "PC INPUTTED" 9display screen C11) as the display meaning the input of new apparatus side security code is complete in the display unit 43.

Next, the MPU 51 changes the present apparatus security code (before change) (5432) stored in the nonvolatile memory 59 to the new apparatus security code (after change) (2345), and terminates the security code changing process, and returns to step SF6 in FIG. 6, and the same process is repeated. Thereafter, until the next change is made, the changed apparatus side security code is used in the IC card processor 60.

As explained herein, according to the IC card processor 60 in the second embodiment, the apparatus side security code is stored in the nonvolatile memory 59 in the initial state, and this apparatus side security code is used in the subsequent operation, and user's manual input of apparatus side security code is not needed every time, and the convenience for the user is enhanced.

Further, according to the IC card processor 60 of the second embodiment, using the unlock key 62 and lock key 61 as shown in FIG. 4, the apparatus side security code and unlock command (or lock command) are automatically issued to the IC card 22 to change the security mode when the unlock key 62 or lock key 61 is pushed, and therefore the security mode can be changed by a single operation of the user, and the convenience for the user is also enhanced.

In addition, according to the IC card processor 60 of the second embodiment, the apparatus side security code stored already in the nonvolatile memory 59 can be changed by the user, so that it is flexible depending on the convenience for the user.

The IC card processor 60 according to the second embodiment of the invention is described so far, but the specific configuration is not limited to the second embodiment alone, but changes and modifications in a range not departing from the true spirit of the invention may be also included in the scope of the invention. For example, in the IC card processor 60 of the second embodiment, as explained by reference to FIG. 8, as soon as the input of the apparatus side security code is over, it is stored in the nonvolatile memory 59 as the official apparatus side security code, but, alternatively, in order to prevent input error, it may be changed to enter the apparatus side security code twice.

In this case, the MPU 51 collates the apparatus side security side entered the first time and the apparatus side security code entered the second time, and only when matched, it is stored in the nonvolatile memory 59 as the official apparatus side security code.

The technique of entering the apparatus side security code twice may be also applied in the apparatus side security code changing process explained in relation to FIG. 11. In this case, when the present apparatus side security code (before change) is entered twice, the MPU 51 collates the first apparatus side security code and second apparatus side security code, and accepts the new apparatus side security code (after change) only when matched.

In the second embodiment, the lock key 61 and unlock key 62 shown in FIG. 4 are assigned with a common apparatus side security code, but the lock key 61 may be assigned with an exclusive first apparatus side security code, and the unlock key 62, with an exclusive second apparatus side security code (not the first apparatus side security code).

In this case, in the apparatus side security code input process (step SF3 in FIG. 6), the first apparatus side security code and second apparatus side security code are entered separately, and they are stored in the nonvolatile memory 59.

Further, in the IC 22 of the IC card 20 (see FIG. 5), first and second card side security codes corresponding to the first and second apparatus side security codes are held, and in the same operation as mentioned above, the first apparatus side security code (or the second apparatus side security code) and the first card side security code (or second card side security code) are collated.

Also in the second embodiment, the user's input result (apparatus side security code) is stored in the nonvolatile memory 59 by the apparatus side security code input process (step SF3 in FIG. 6), but the apparatus side security code may be preliminarily stored in the nonvolatile memory 59 in the manufacturing process.

Figure 12:
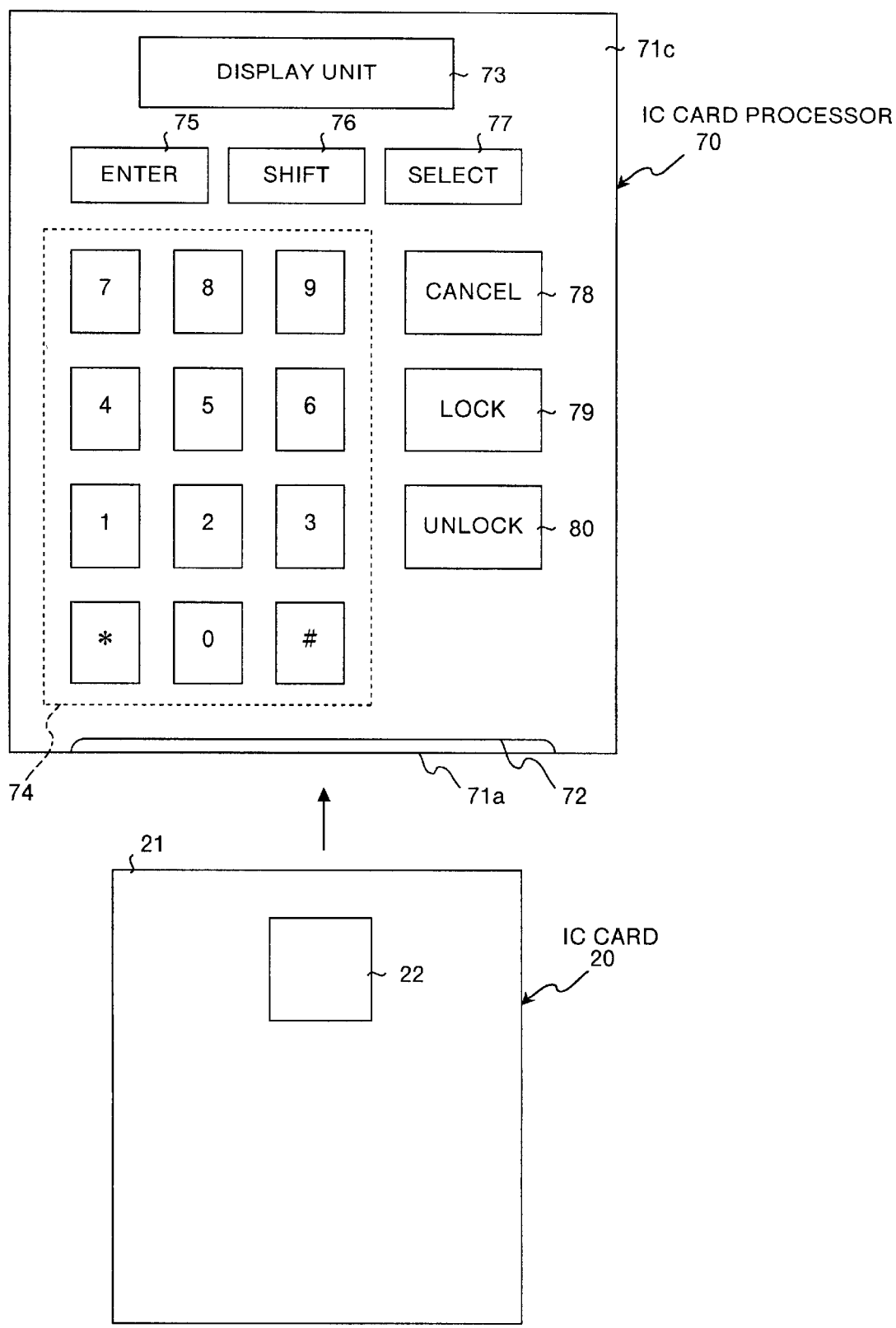
FIG. 12 is a plan showing an outline configuration of an IC card processor in a first modified example of the second embodiment.

In the second embodiment, the IC card processor 60 as shown in FIG. 4 is used, but it may also replaced by other IC card processor 70 shown in FIG. 12. In FIG. 12, in IC card processor 70 is a pocket calculator type device, and is larger than the IC card processor 60 shown in FIG. 4.

In the IC card processor 70, a main body 71 is a thick plate of synthetic resin, and electric components are contained inside. A card inlet 72 is formed as a slit in one side 71*a* toward other side 71*c*, and one side of an IC card 20 is inserted in this card inlet 72.

A display unit 73 is provided on the surface 71*b* of the main body 71 along other side 71*c*. The function of the display unit 73 is same as that of the display unit 43 (see FIG. 4). A numeric keyboard 74 is composed of 0 key to 9 key, * key, and # key arranged in matrix on the surface 71*b*. The numeric keyboard 74 is used for input of apparatus side security code. Therefore, when using the IC card processor 70, the user directly enters the numerals from the numeric keyboard 74, instead of the process at step SG2 to SG11 (see FIG. 8), and step SH2 to step SH10 (see FIG. 11).

An enter key 75, a shift key 76, and a select key 77 are provided on the surface 71*b*, beneath the display unit 73 in the drawing, corresponding to the enter key 46, shift key 45, and select key 44 shown in FIG. 4. A cancel key 78 is provided near the right side of the numeric keyboard 74. A lock key 79 and an unlock key 80 are provided on the surface 71*b*, at the right side of the numeric keyboard 74, and the functions are same as in the lock key 61 and unlock key 62 in FIG. 4. The operation of the IC card processor 70 is same as the operation of the IC card processor 60 in FIG. 4, and detailed description is omitted.

Figure 13:
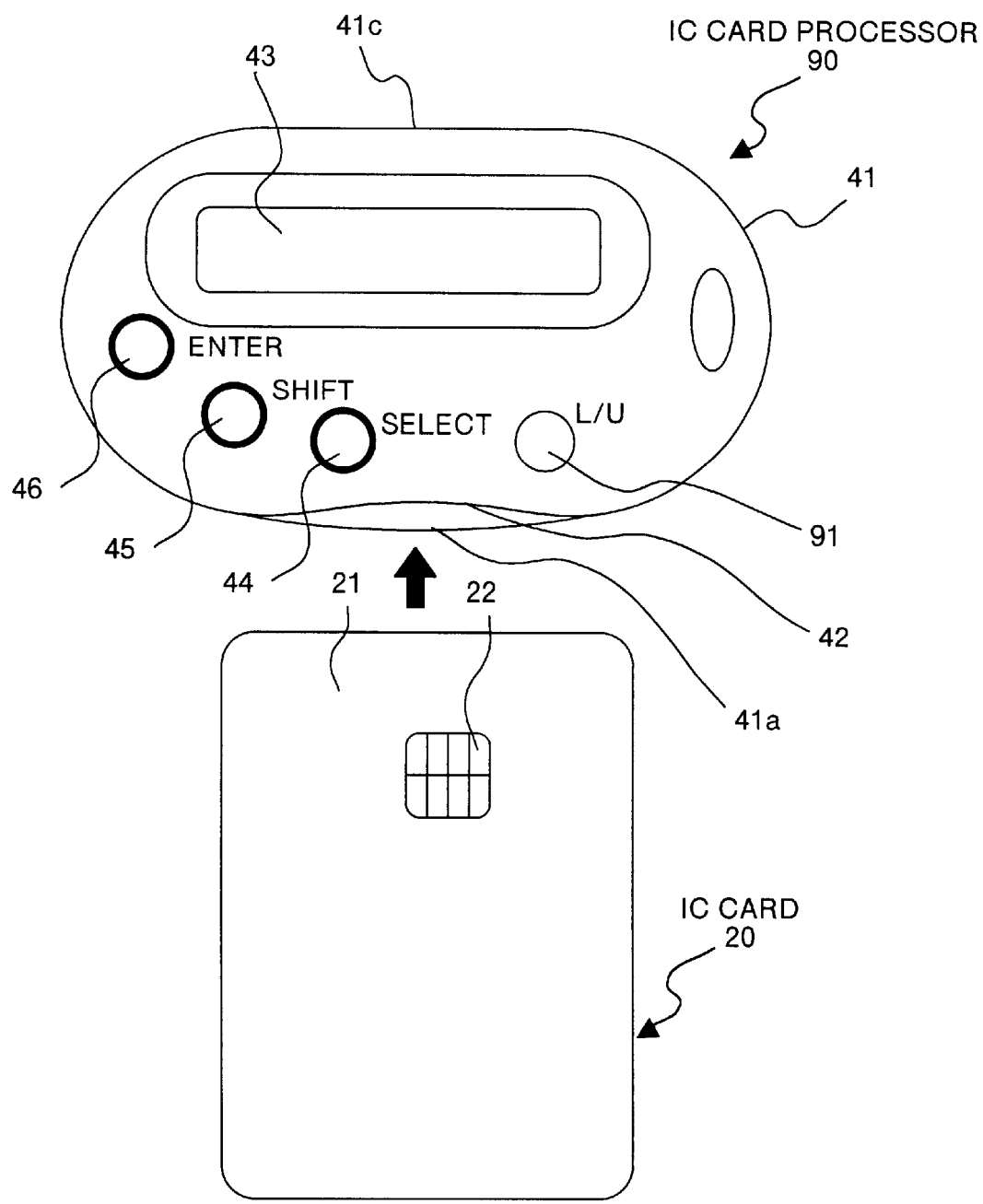
FIG. 13 is a plan showing an outline configuration of an IC card processor in a second modified example of the second embodiment.

Further, in the second embodiment, the lock key 61 and unlock key 62 shown in FIG. 4 are individually provided with the lock mode changing function and unlock mode changing function, but, alternatively, in a different IC card processor 90 as shown in FIG. 13, one lock/unlock common key 91 may be provided with the lock mode changing function and unlock mode changing function. In this case, every time the lock/unlock common key 91 is pushed, the lock mode changing function and unlock mode changing function are alternately selected.

Figure 14:
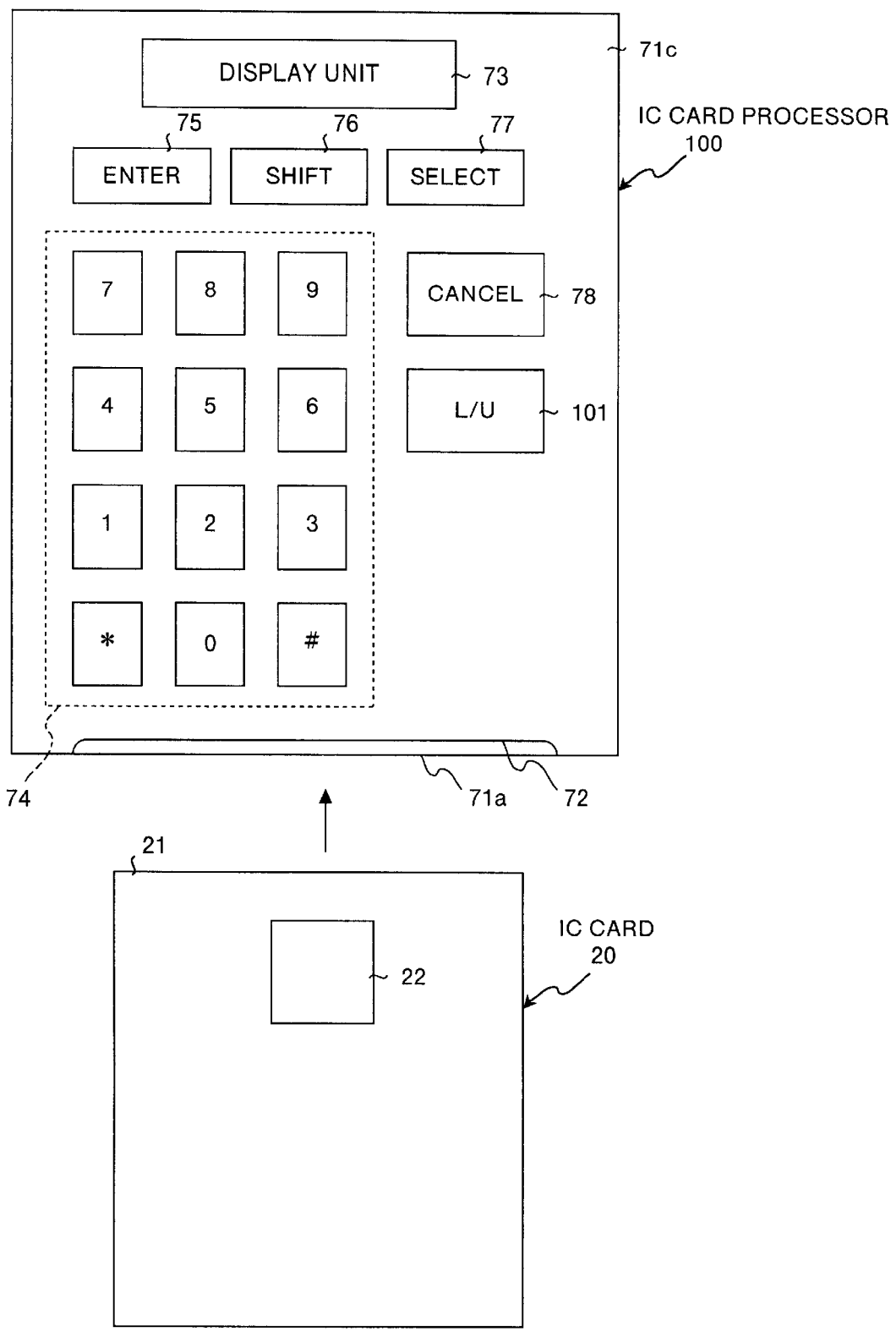
FIG. 14 is a plan showing an outline configuration of an IC card processor in a third modified example of the second embodiment.

In the second embodiment, instead of the IC card processor 70 shown in FIG. 12, an IC card processor 100 shown in FIG. 14 may be used. That is, in the IC card processor 100, instead of the lock key 79 and unlock key 80 shown in FIG. 12, a lock/unlock common key 101 having the same function as the lock/unlock common key 91 (see FIG. 13) is provided.

In addition, in the second embodiment, the apparatus side security code entered in the apparatus side security code input process (step SF3) shown in FIG. 6 is directly stored in the nonvolatile memory 59, and it is used in collation of codes in the IC card 20 (IC 22), but the entered apparatus side security code may once scrambled, and stored in the nonvolatile memory 59 as a scrambled security code.

More specifically, the entered apparatus side security code is combined with the initial response data issued from the IC 22 at the time of activation process mentioned above, or the intrinsic data of the MPU 51, and stored in the nonvolatile memory 59 as scrambled security code.

This scrambled security code is issued, at step SZF4 in FIG. 6, to the IC 22 instead of the apparatus side security code, and the entered scrambled security code is held in the IC 22 as the card side security code. Therefore, in the subsequent code collation process, the IC 22 collates the held card side security code (scrambled security code) and the scrambled security code entered from the IC card processor.

Because of such scrambling function, when the apparatus side security code entered by the user is scrambled, the IC card processor 60 and the loaded IC card 20 are related to each other one by one in an inseparable relation, and only the authorized user is permitted to refer to the card information in the IC card 20, so that the security is enhanced in the subsequent use.

Further, in the IC card processor 60 in the second embodiment, aside from the apparatus side security code mentioned above, an apparatus side permit security code for permitting execution of various functions (reading function of card information, etc.) of the IC card processor 60 may be entered in the same process as in the apparatus side security code input process (step SF3) shown in FIG. 6, and it may be stored in the nonvolatile memory 59 shown in FIG. 5.

In this case, first, in order to execute the functions of the IC card processor 60, the user enters the same security code as the apparatus side permit security code in the same procedure as mentioned above. As a result, the MPU 51 collates the apparatus side permit security code stored in the nonvolatile memory 59 and the entered security code, and only when matched, the IC card processor 60 is set in a state for realizing the functions (unlock state).

If not matched, the IC card processor 60 is set in lock state and is unable to realize the functions, and if reading of card information is instructed by user's input operation in this state, the MPU 51 does not execute the reading operation.

To the contrary, in the IC card processor 60 of the second embodiment, in addition to the card side security code, a card side permit security code for permitting execution of various functions (reading function of card information, etc.) of the IC card 20 (IC 22) may be held. In this case, to execute the functions of the IC card 20 (IC 22), the user enters the same security code as the card side permit security code in the same procedure from the keyboard 58B.

Consequently, the MPU 51 issues the entered security code to the IC 22 through the bus BU and 58. In the IC 22, the entered security code and held card side permit security code are collated, and only when matched, it is set in function realizing state (unlock state).

If not matched, the IC card 20 is locked and functions cannot be realized, and if any access is made to the MPU 51 in this state, no operation is effected.

Thus, when the apparatus side permit security code or card side permit security code is used, a third party cannot use the IC card processor 60 or IC card 20 (IC 22), so that the security against third party is enhanced.

Also in the second embodiment, the apparatus side permit security code and card side permit security code may be provided in both IC card processor 60 and IC card 20 (IC 22). In this case, a double security is assured in the IC card processor 60 and IC card 20, so that the security against third party may be further enhanced.

An IC card processor in a third embodiment of the invention is explained. The hardware configuration of the IC card processor in the third embodiment is same as that of the IC card processor 60 shown in FIG. 4 and FIG. 5, and it is explained by referring to FIG. 4 and FIG. 5.

However, in the IC card processor of the third embodiment, the information stored in the IC 22 of the IC card 20 shown in FIG. 5, the operation of the MPU 51, and the information stored in the nonvolatile memory 59 are different from those of the IC card processor 60 of the second embodiment.

That is, in the IC card processor of the third embodiment, the IC 22 stores, aside from the card side security code mentioned above, name information, numerical information, medical record and criminal record as shown in FIG. 15 as the card information. The name information includes the name and telephone number of the owner (user) of the IC card 20.

Further, in the memory region of addresses 0011 to 0020 of the IC 22, numerical information is stored. The numerical information includes the balance information, paid-in history information, and paid-out history information. In the memory region of addresses 0021 to 0030 of the IC 22, the medical record is stored, and the medical record is the information including the past history of diseases and hospital records of the owner (user) of the IC card 20. In addition, in the memory region of addresses 0031 to 0040 of the IC 22, the criminal record is stored, and the criminal record is the information including the past criminal history of the owner (user) of the IC card 20.

In the IC card processor of the third embodiment, in the nonvolatile memory 59 shown in FIG. 5, in addition to the apparatus side security code, security level setting information is stored. The security level setting information is the ranking information of the information display in the display unit 43 (see FIG. 1) (name information, numerical information, medical record and criminal record), ranging from level 1 to level 5 from the viewpoint of security. Specifically, level 1 is the highest security and level 5 is the lowest.

As shown in FIG. 16, when the security level is set at level 1, any information is not shown in the display unit 43, and at level 2, only the name information is shown in the display unit 43. At the security level of 3, the name information and numerical information are displayed, while the medical record and criminal record known only to the hospital and police as third party are not shown in the display unit 43. At the security level of 4, the name information, numerical information, and medical record are shown in the display 43. Finally at the security level of 5, all of the name information, numerical information, medical record and criminal record are shown in the display unit 43.

The operation of the features of the IC card processor of the third embodiment is explained below by referring to the flowcharts in FIG. 17 and FIG. 18. The flowcharts in FIG. 17 and FIG. 18 and the flowcharts in FIG. 6 and FIG. 7 roughly correspond to each other, that is, step SJ1 to step SJ3 in FIG. 17 correspond by one by to step SF1 to step SF3 in FIG. 6, and their detailed description is omitted.

Figure 17:
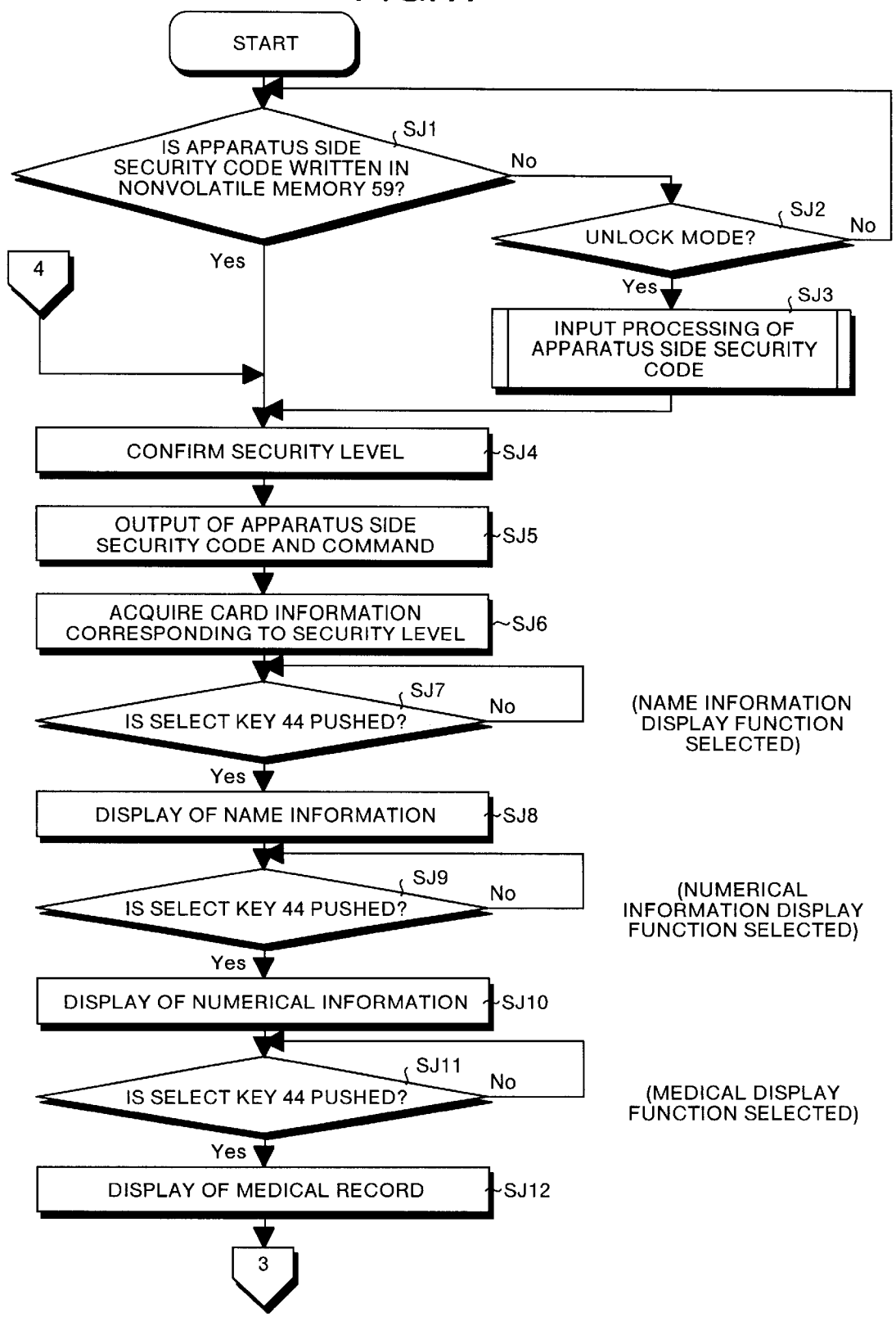
FIG. 17 is a flowchart explaining the operation of the IC card processor in the third embodiment.

In this configuration, when one side of the IC card 20 in unlock mode shown in FIG. 4 is inserted into the card inlet 42, after step SJ1 to step SJ3 in FIG. 17, the apparatus side security code is stored in the nonvolatile memory 59 in FIG. 5. Also in the nonvolatile memory 59, suppose the information of level 1 shown in FIG. 16 is stored as the initial security level setting information.

At step SJ4, the MPU 51 (see FIG. 5) refers to the security level setting information stored in the nonvolatile memory 59, and recognizes the security level. In this case, since level 1 is set as the security level shown in FIG. 16, the MPU 51 recognizes the security level is level 1, and advances to step SJ5.

At step SJ5, the MPU 51 first reads out the apparatus side security code from the nonvolatile memory 59 through the bus BU. Then the MPU 51 issues the read apparatus side security code and the command for reading the card information of the IC card 20 to the IC through the bus BU and communication unit 58, and advances to step SJ6.

When the apparatus side security code and command are entered, the IC 22 collates, in the same operation as mentioned above, the held card side security code and entered apparatus side security code, and when matched, the IC 22 maintain the unlock mode.

At step SJ6, the MPU 51 acquires the card information from the IC 22 depending on the security level. Specifically, when the security level is 1 (see FIG. 16), the MPU 51 reads in none of the information. When the security level is 2 (see FIG. 16), the MPU 51 reads in the name information stored the memory region of addresses 0000 to 0010 shown in FIG. 15 through the communication unit 48 and bus BU.

When the security level is 3 (see FIG. 16), the MPU 51 reads in the name information and numerical information stored the memory region of addresses 0000 to 0020 shown in FIG. 15. When the security level is 4 (see FIG. 16), the MPU 51 reads in the name information, numerical information and medical record stored the memory region of addresses 0000 to 0030 shown in FIG. 15, and when the security level is 5 (see FIG. 16), the MPU 51 reads in the name information, numerical information, medical record and criminal record stored the memory region of addresses 0000 to 0040 shown in FIG. 15.

In this case, since the security level is set at level 1, the MPU 51 acquires no information from the IC 22, and goes to step SJ7. At step SJ7, the MPU 51 judges if the select key 44 (see FIG. 4) is pushed by the user or not, that is, the name information display function for showing the name information in the display unit 43 is selected or not, and if judged NO, the same judgment is repeated. When the user pushes the select key 44, the MPU 51 judges YES at step SJ7, and goes to step SJ8.

At step SJ8, the MPU 51 attempts to show the name information in the display unit 43, but since the security level is 1 (see FIG. 16), it goes to step SJ9 without showing any information in the display unit 43. At step SJ9, the MPU 51 judges, same as at step SJ7, if the select key 44 is pushed by the user or not, that is, the numerical information display function for showing the numerical information in the display unit 43 is selected or not. When the user pushes the select key 44, the MPU 51 judges YES at step SJ9, and goes to step SJ10.

At step SJ10, the MPU 51 attempts to show the numerical information in the display unit 43, but since the security level is 1, it goes to step SJ11 without showing any information in the display unit 43 same as at step SJ8. At step SJ11, the MPU 51 judges, same as at step SJ7, if the select key 44 is pushed by the user or not, that is, the medical record display function for showing the medical record in the display unit 43 is selected or not. When the user pushes the select key 44, the MPU 51 judges YES at step SJ11, and goes to step SJ12.

Figure 18:
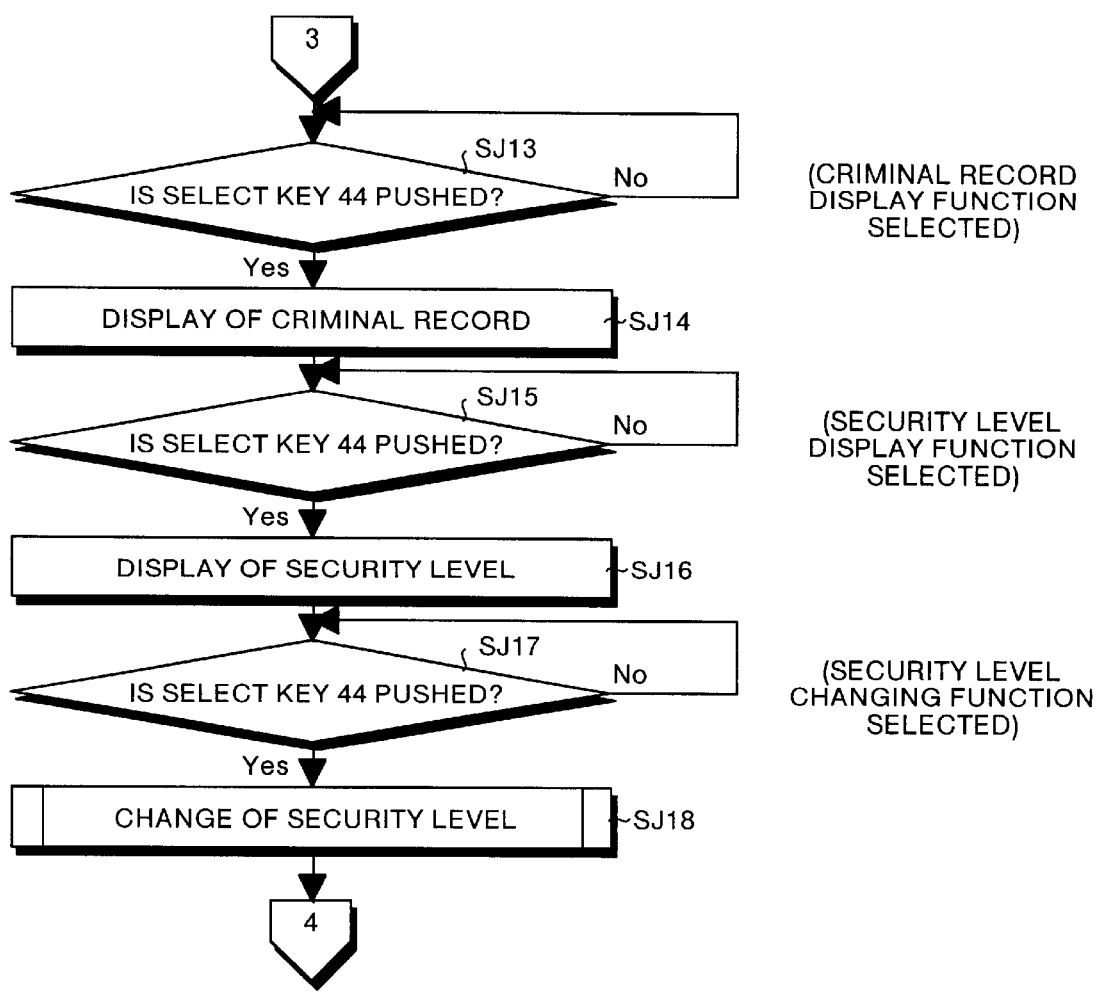
FIG. 18 is a flowchart explaining the operation of the IC card processor in the third embodiment.

At step SJ12, the MPU 51 attempts to show the medical record in the display unit 43, but since the security level is 1, it goes to step SJ13 in FIG. 18 without showing any information in the display unit 43. At step SJ13, the MPU 51 judges if the select key 44 is pushed by the user or not, that is, the criminal record display function for showing the criminal record in the display unit 43 is selected or not.

When the user pushes the select key 44, the MPU 51 judges YES at step SJ13, and goes to step SJ14. At step SJ14, the MPU 51 attempts to show the criminal record in the display unit 43, but since the security level is 1, it goes to step SJ15 without showing any information in the display unit 43.

At step SJ15, the MPU 51 judges if the select key 44 is pushed or not, that is, the security level display function for showing the presently set security level in the display unit 43 is selected or not. When the user pushes the select key 44, the MPU 51 judges YES at step SJ15, and goes to step SJ16.

Figure 19:
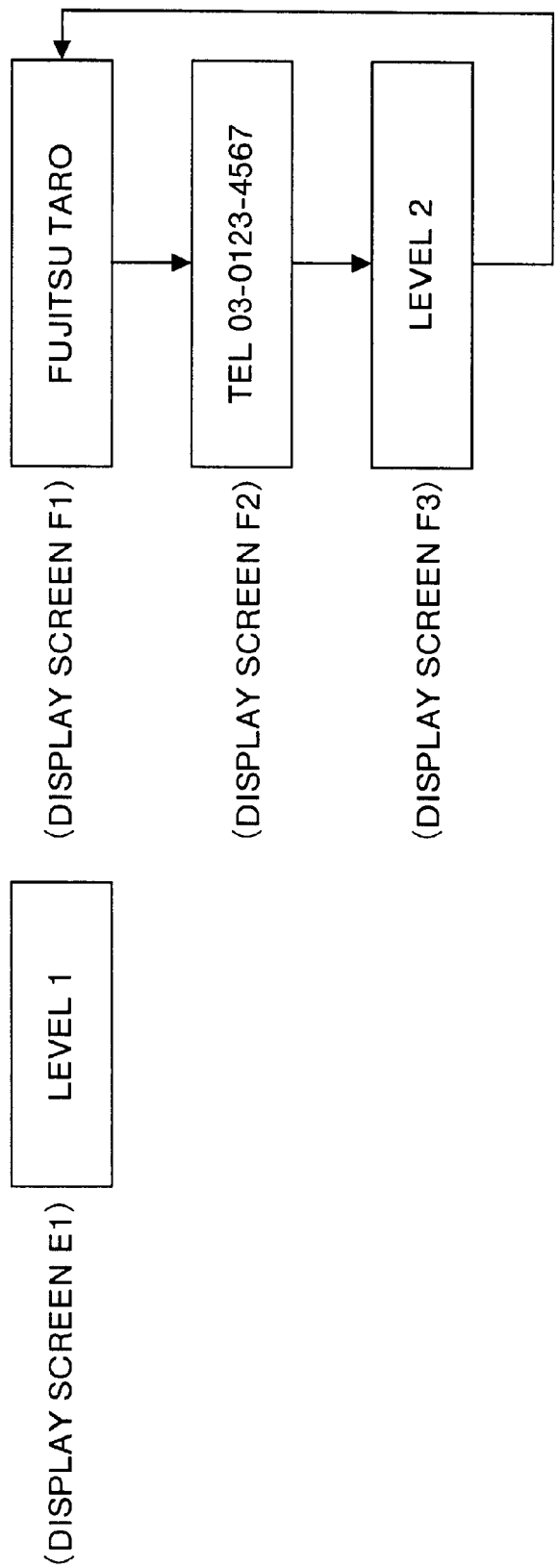
FIG. 19 is a diagram showing a display screen example of the IC card processor in the third embodiment.

At step SJ16, the MPU 51 shows the present security level (level 1) in the display unit 43, and advances to step SJ17. As a result, a character-numeral string of "Level 1" (display screen E1) as shown in FIG. 19 is shown in the display unit 43.

At step SJ17, the MPU 51 judges if the select key 44 is pushed or not, that is, the security level changing function for changing (setting) the security level is selected or not. In this case, when the user pushes the select key 44 in order to change the security level from level 1 to level 2, the MPU 51 judges YES at step SJ17, and goes to step SJ18, and shows a character string "Level 1" in the display unit 43 as shown in the display screen in FIG. 20, and changes the security level. Herein, "Level 1" means that the present security level (before change) is level 1.

Figure 20:
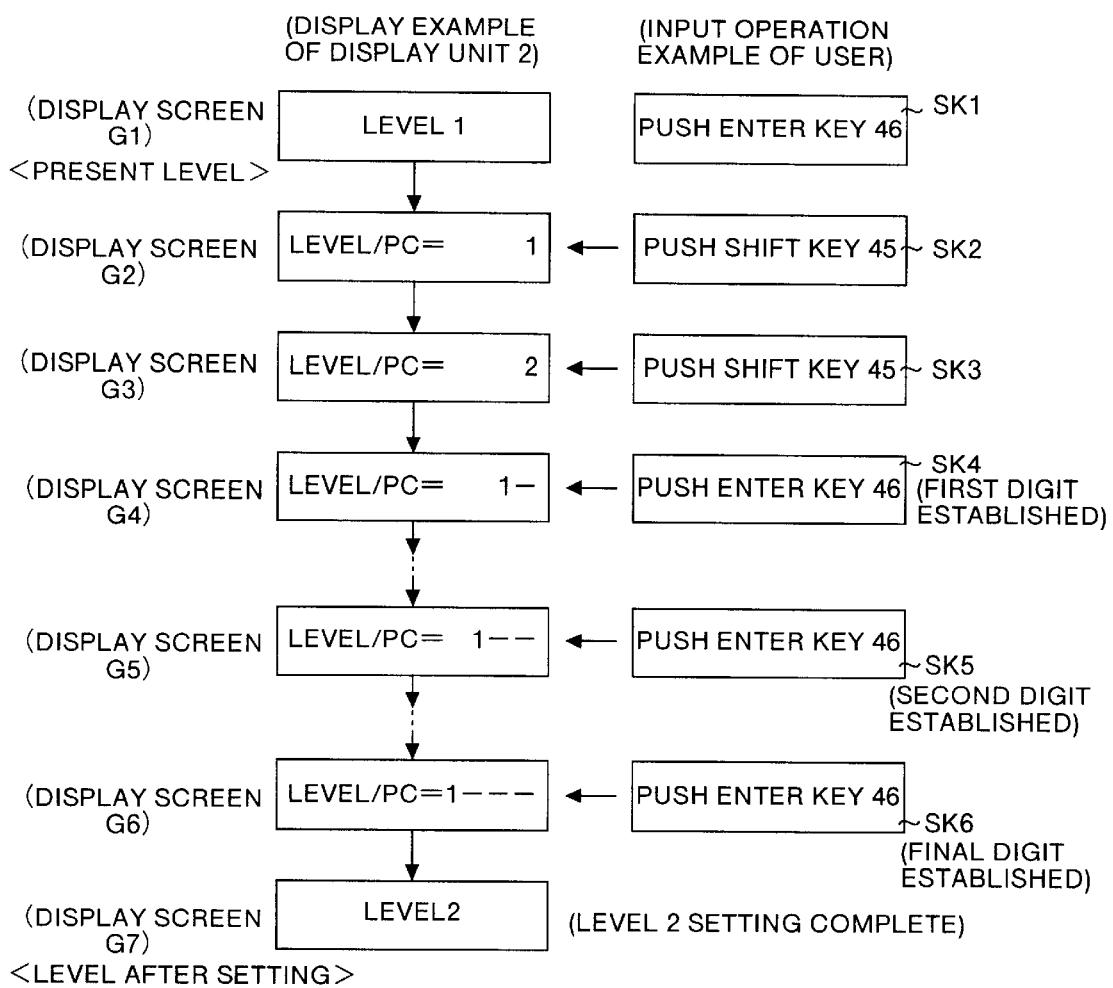
FIG. 20 is a diagram explaining security level changing process of the IC card processor in the third embodiment.

The detail of the security level changing process is explained by referring to FIG. 20. The user, recognizing "Level 1" on the display screen G1, goes to step SK1 in order to enter the numeral of the first digit (for example, 5) of the apparatus side security code (for example, 5432), and pushes the enter key 46 (see FIG. 4), and pushes the shift key 45 (see FIG. 4) at step SK2. As a result, the display screen of the display unit 43 is changed from the display screen G1 to the display screen G2 of the display unit 43 by the control of the MPU 31, and the display unit 43 shows a character-numeral string "Level/PC=1" (display screen G2). Herein, of the display "Level/PC," "Level" corresponds to the present security level (before change), and "PC" denotes the apparatus side security code.

At step SK3 to step SK6, when the user pushes the shift key 45 (enter key 46) sequentially, the display screen of the display unit 43 is sequentially changed to display screen G2 to display screen G6, and the numerals of the first to final digit of the present apparatus side security code (5, 4, 3, 2) are established respectively. In "Level/PC=1—" on the display screen G6, "1" means the security level is level 1, and "—" corresponds to the established apparatus side security code. At step SK6, when the final digit numeral (2) is established, "5432" is recognized as the present apparatus side security code.

Consequently, the MPU 51 collates the apparatus side security code stored in the nonvolatile memory 59 and the entered present apparatus side security code. If not matched, it is a code input error, and the security level changing process is terminated without changing the security level, returning to step SJ4 shown in FIG. 17, and the same process is repeated.

If matched, the MPU 51 changes the security level from the present level 1 to level 2, and shows a character-numeral string "Level 2" (display screen G7) in the display unit 43, and returns to step SJ4 in FIG. 17, and repeats the same process. Herein, "Level 2" (display screen G7) means the security level after change.

Supposing level 2 is set as the security level, hereinafter, at step SJ4 shown in FIG. 17, level 2 is recognized as the security level, and at step SJ5, the apparatus side security code and command are issued to the IC 22 through the bus BU and communication unit 56. Further, at step SJ6, depending on level 2 (see FIG. 16), the name information stored in the memory region of addresses 000 to 00010 shown in FIG. 15 is read out.

At step SJ7, when the select key 44 is pushed, at step SJ8, the name information is shown in the display unit 43. For example, in the display unit 43, after "Fujitsu Taro" (display screen F1) shown in FIG. 19 is displayed, "TEL03-0123-4567" (display screen F2) is sequentially displayed.

If the select key 44 is pushed at step SJ9 shown in FIG. 17, since the level is 2 (see FIG. 16), numerical information is not displayed at step SJ10. Similarly, if the select key 44 is pushed at step SJ11, the medical record is not displayed at step SJ12 because of level 2. Further, if the select key 44 is pushed at step SJ13 in FIG. 18, the criminal record is not displayed at step SJ14 because of level 2.

At step SJ15, when the select key 44 is pushed, at step SJ16, "Level 2" (display screen F3) shown in FIG. 19 is shown in the display unit 43. That is, as far as the security level is level 2, the display unit 43 shows the information corresponding to level 2 sequentially as shown in FIG. 19, that is, "Fujitsu Taro" (display screen F1), "TEL03-0123-4567" (display screen F2), and "Level 2" (display screen F3).

As explained herein, according to the IC card processor of the third embodiment, since the card information to be read out is ranked from level 1 to level 5 in consideration of degree of security, the security against leak of information enhanced by setting the confidential information at a proper level so that the level may not be selected.

The IC card processor of the third embodiment is explained, but the specific configuration is not limited to the third embodiment alone, but design changes in a range not departing from the true spirit of the invention may be included in the scope of the invention. For example, in the IC card processor of the third embodiment, as the security level providing information, the name information, numerical information, medical record and criminal record shown in FIG. 16 are used, but they are only examples, and the type and quantity of information are not specified. Other types of information may include civil information (name, address, telephone number, blood type, etc.), income information (monthly wage, annual income, etc.), personal information (driver's license number, health insurance list number, etc.).

In the IC card processor of the third embodiment, as shown in FIG. 6, the degree of security is divided in five levels, level 1 to level 5, but the number of levels and level providing information may be properly changed depending on the confidential level or importance of information.

Further, in the IC card processor of the third embodiment, five level keys corresponding to level 1 to level 1 of security level are provided in the IC card processor 60 shown in FIG. 4, and as triggered by pushing of the corresponding level key, the information of security level corresponding to the level key may be read out from the IC 22 of the IC card 20 by the control of the MPU 51. In this case, by one-touch operation to push the level key, the information of the corresponding security level is read out from the IC 22, and shown in the display unit 43, so that the convenience for the user is further enhanced.

In other example of configuration, level 1 to level 5 of five security levels may correspond to five keys in FIG. 4, that is, select key 44, shift key 45, enter key 46, lock key 61, and unlock key 62, and, for example, when the select key 44 is pushed twice, the information of level 1 may be read out from the IC 22 by the control of the MPU 51.

In addition, in the IC card processor of the third embodiment, level 1 to level 5 of security levels may correspond to 1 key to 5 key of the numeric keyboard 74 in FIG. 12, and the lock key 79 is provided with level information display function, and, for example, when the lock key 79 is pushed and 1 key is pushed, the information of level 1 corresponding to 1 key may be read out from the IC 22 by the control of the MPU 51.

In a different example of configuration, when the lock key 79 and 1 key are pushed simultaneously, for example, the information of level 1 corresponding to 1 key may be read out from the IC 22 by the control of the MPU 51.

The invention is explained so far relating to embodiments 1 to 3, but the specific configurations are not limited to these embodiments 1 to 3 alone, but other design changes and modifications not departing from the true spirit of the invention may be included in the scope of the invention. For example, in these embodiments 1 to 3, the object of processing is the IC card 20 for electronic cash, but this is only an example, and the application of the IC card 20 is not limited to the electronic cash alone, but maybe applied to the IC card of any application.

In the foregoing embodiments 1 to 3, plural configurations are explained, and these configurations may be executed either individually, or in combination of proper plural examples of configurations, which should be also included in the scope of the invention.

As explained herein, according to the IC card processor of one aspect of this invention, in the initial state, when the IC card is connected, the second security code of the IC is written into the nonvolatile memory as the first security code. Therefore, according to the IC card processor of the invention, when the IC card is connected again in this state, the first security code of the nonvolatile memory is issued to the IC without user's operation, and the card information is read out automatically by the reading unit. Hence, according to the IC card processor of the invention, unlike the prior art, since it is not required to enter the security code every time, the convenience for the user is enhanced significantly.

According to the IC card processor of another aspect of this invention, when the first security code is entered preliminarily by the inputting unit, this first security code is written into the nonvolatile memory by the writing unit. Therefore, in the IC card processor of the invention, when the IC card is connected, the first security code is readout automatically by the nonvolatile memory, and issued to the IC, and the card information is read out by the reading unit, and therefore, unlike the prior art, input of security code is not required, and the convenience for the user is enhanced.

Furthermore, since the card information corresponding to the preset level is read out, the security against leak of information can be enhanced by setting the confidential information at due level so that the level may not be selected.

Furthermore, the IC card processor of the invention is provided with operators corresponding to the plural levels, and the controllability by the user is enhanced, and the security against leak of information is enhanced as the effect of level setting.

According to the IC card processor of still another aspect of this invention, only when the user manipulates the operator, the state control information is issued to the IC automatically by the state control unit, and the IC state is controlled, so that not only the controllability by the user but also the convenience of use are improved.

According to the IC card processor of still another aspect of this invention, since the first and second operators are provided, the controllability by the user is enhanced, and the convenience for the user is also improved because the user is not required to enter the first and second state control information every time.

According to the IC card processor of still another aspect of this invention, since one operator has two functions, the number of operators can be curtailed, and it is much easier for the user because two functions can be realized by manipulating only one operator.

Industrial Applicability

Thus, the IC card processor of the invention is carried together with the IC card as the holder of electronic cash, and is useful for checking and processing the card information in the IC card.

What is claimed is:

1. An IC card processor for processing card information in an IC card mounting an IC for controlling access from an external apparatus on a basis of a result of collation between a first security code entered from an external apparatus and a preliminarily held second security code, the IC card processor comprising:

a nonvolatile memory;

a unit for reading the second security code from the IC when the IC card is connected and the first security code is not written in the nonvolatile memory, and for writing the second security code as the first security code in the nonvolatile memory;

a unit for reading the first security code from the nonvolatile memory when the IC card is connected, and for reading out the card information from the IC after issuing the first security code to the IC; and a control unit for processing the card information being read out by the unit for reading out card information as specified.

2. The IC card processor of claim 1, further comprising:
a level setting unit for setting plural levels in the card information; and
a level selecting unit for selecting one of the plural levels, wherein the unit for reading out card information reads out the card information corresponding to the level selected by the level selecting unit.

3. The IC card processor of claim 2, wherein the level selecting unit includes plural operators provided corresponding to plural levels, to be operated by a user, and
the unit for reading out card information reads out the card information corresponding to one of the plural operators.

4. An IC card processor for processing card information in an IC card mounting an IC for controlling access from an external apparatus on a basis of a result of collation between a first security code entered from an external apparatus and a preliminarily held second security code, the IC card processor comprising:
a nonvolatile memory;
an inputting unit for entering the first security code;
a unit for writing the first security code entered by the inputting unit into the nonvolatile memory;
a unit for reading the first security code from the nonvolatile memory when the IC card is connected, and for reading out the card information from the IC after issuing the first security code to the IC; and
a control unit for processing the card information being read out by unit for reading out card information as specified.

5. The IC card processor of claim 4, further comprising:
a level setting unit for setting plural levels in the card information; and
a level selecting unit for selecting one of the plural levels, wherein the unit for reading out card information reads out the card information corresponding to the level selected by the level selecting unit.

6. The IC card processor of claim 5, wherein the level selecting unit includes plural operators provided corresponding to plural levels, to be operated by the user, and
the unit for reading out card information reads out the card information corresponding to one of the plural operators.

7. An IC card processor loaded with an IC card mounting an IC of which electric state is controlled depending on state control information entered from an external apparatus, the IC card processor comprising:
a nonvolatile memory for storing the state control information;
an operator for manipulation by a user when controlling the IC state; and
a state control unit for controlling the IC state, when the operator is manipulated, by issuing the state control information stored in the nonvolatile memory to the IC.

8. An IC card processor loaded with an IC card mounting an IC of which electric state is controlled to a first state depending on first state control information entered from an external apparatus, and electric state is controlled in a second state depending on second state control information entered from the external apparatus, the IC card processor comprising:
a nonvolatile memory for storing the first and second state control information;
a first operator for manipulation by a user when controlling the IC state in the first state;
a second operator for manipulation by the user when controlling the IC state in the second state; and
a control unit for controlling the IC state in the first state, when the first operator is manipulated, by issuing the first state control information stored in the nonvolatile memory to the IC, and for controlling the IC state in the second state, when the second operator is manipulated, by issuing the second state control information stored in the nonvolatile memory to the IC.

9. An IC card processor loaded with an IC card mounting an IC of which electric state is controlled to a first state depending on first state control information entered from an external apparatus, and electric state is controlled in a second state depending on second state control information entered from the external apparatus, the IC card processor comprising:
a nonvolatile memory for storing the first and second state control information;
an operator for manipulation by a user when controlling the IC state in the first or second state; and
a state control unit for controlling the IC state in the first or second state, every time the operator is manipulated, by issuing the first state control information and second state control information alternately to the IC.

* * * * *